(12) United States Patent
Uchida et al.

(10) Patent No.: US 11,428,545 B2
(45) Date of Patent: *Aug. 30, 2022

(54) POSITION DETECTION DEVICE

(71) Applicant: TDK CORPORATION, Tokyo (JP)

(72) Inventors: Keisuke Uchida, Tokyo (JP); Yongfu Cai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,579

(22) Filed: May 19, 2020

(65) Prior Publication Data

US 2020/0386577 A1 Dec. 10, 2020

(30) Foreign Application Priority Data

Jun. 5, 2019 (JP) .............................. JP2019-105075

(51) Int. Cl.
*G01D 5/16* (2006.01)
(52) U.S. Cl.
CPC ....................................... *G01D 5/16* (2013.01)
(58) Field of Classification Search
CPC ......................................................... G01D 5/16
See application file for complete search history.

(56) References Cited

U.S. PATENT DOCUMENTS 8,110,119 B2 * 2/2012 Breuer ............... G01R 33/0206 216/22
2006/0176142 A1 8/2006 Naito et al.

| 2008/0169807 | A1 | 7/2008 | Naito et al. |
| 2012/0038348 | A1 | 2/2012 | Aimuta et al. |
| 2014/0299950 | A1 | 10/2014 | Kim et al. |
| 2015/0192432 | A1 | 7/2015 | Noguchi et al. |
| 2017/0261342 | A1 | 9/2017 | Nagata et al. |

(Continued)

FOREIGN PATENT DOCUMENTS

| JP | S55-154408 U | 11/1980 |
| JP | H01-250875 A | 10/1989 |

(Continued)

OTHER PUBLICATIONS

Translation of Jun. 1, 2021 Office Action issued in Japanese Patent Application No. 2019-105075.

(Continued)

*Primary Examiner* — Walter L Lindsay, Jr.
*Assistant Examiner* — Milton Gonzalez
(74) *Attorney, Agent, or Firm* — Oliff PLC

(57) ABSTRACT

A position detection device includes a magnet that generates a magnetic field to be detected, and a magnetic sensor. The magnetic sensor detects the magnetic field to be detected and generates a detection value corresponding to the position of the magnet. The magnetic field to be detected has a first direction that changes within a first plane, at a reference position in the first plane. The magnetic sensor includes four MR elements. Each of the MR elements includes a first magnetic layer having first magnetization that can change in direction within a second plane corresponding to the each of the MR elements. The first plane and the second plane intersect at a dihedral angle α other than 90°. A detection value depends on the direction of the first magnetization.

11 Claims, 17 Drawing Sheets

(56) References Cited

U.S. PATENT DOCUMENTS

2018/0275218 A1   9/2018  Umetsu
2018/0356473 A1  12/2018  Hirota et al.

FOREIGN PATENT DOCUMENTS

| JP | H09-219546 A | 8/1997 |
| JP | 2004-006752 A | 1/2004 |
| JP | 2005-116828 A | 4/2005 |
| JP | 2006-208020 A | 8/2006 |
| JP | 2008-281556 A | 11/2008 |
| JP | 2008-286739 A | 11/2008 |
| JP | 2012-208063 A | 10/2012 |
| JP | 2018-205241 A | 12/2018 |

OTHER PUBLICATIONS

Translation of May 11, 2021 Office Action issued in Japanese Patent Application No. 2019-105074.
Jun. 21, 2021 U.S. Office Action issued U.S. Appl. No. 16/887,459.
Translation of Jun. 1, 2021 Office Action issued in Japanese Patent Application No. 2019-108115.
Sep. 9, 2021, Notice of Allowance Issued in U.S. Appl. No. 16/887,459.
Sep. 29, 2021 Office Action issued in U.S. Appl. No. 16/878,008.

* cited by examiner

POSITION DETECTION DEVICE

BACKGROUND OF THE INVENTION

1. Field of the Invention

The present invention relates to a position detection device using a magnetic sensor.

2. Description of the Related Art

Position detection devices using magnetic sensors have been used for a variety of applications. The position detection devices using magnetic sensors will hereinafter be referred to as magnetic position detection devices. For example, the magnetic position detection devices are used for detecting a lens position in a camera module having an optical image stabilization mechanism and an autofocus mechanism incorporated in a smartphone.

A magnetic position detection devices include, for example, a magnet that moves with movement of an object, and a magnetic sensor that detects a magnetic field generated by the magnet. Examples of known magnetic sensors include one that uses a spin-valve magnetoresistive element provided on a substrate. The spin-valve magnetoresistive element includes a magnetization pinned layer having a magnetization whose direction is fixed, a free layer having a magnetization whose direction is variable depending on the direction of an applied magnetic field, and a gap layer located between the magnetization pinned layer and the free layer. In many cases, the spin-valve magnetoresistive element provided on a substrate is configured to have sensitivity to a magnetic field in a direction parallel to the surface of the substrate. Such a magnetoresistive element is thus suitable to detect a magnetic field that changes in direction within a plane parallel to the substrate surface.

Some magnetic position detection devices are configured to detect a magnetic field containing a component in a direction perpendicular to the surface of a substrate by using a magnetoresistive element provided on the substrate. An example of such magnetic position devices is described in US 2015/0192432 A1 and JP H09-219546 A.

US 2015/0192432 A1 describes a magnetic sensor for detecting the position of a magnet. This magnetic sensor includes a substrate, two magnetic sensor elements located on the substrate, a magnet located above the substrate, and a soft magnetic body. The soft magnetic body is located between the magnet and the two magnetic sensor elements. The soft magnetic body converts a magnetic field on an XZ plane, generated by the magnet, into a magnetic field on an XY plane to which the two magnetic sensor elements have sensitivity. The XY plane is parallel to the substrate surface. The XZ plane is perpendicular to the substrate surface.

JP H09-219546 A describes a device in which a magnetoresistive element including magnetic stripes is located on a slope formed on a substrate, and a rotating body including a magnet is located above the substrate. In this device, as the rotating body rotates, the direction of a magnetic field generated by the rotating body changes within a plane of variation perpendicular to the slope. The magnetoresistive element detects the magnetic field generated by the rotating body.

US 2008/0169807 A1 and US 2018/0275218 A1 describe, although not a magnetic position detection device, a device including three sensors for detecting an X-direction component, a Y-direction component, and a Z-direction component of an external magnetic field. In this device, the sensor for detecting the Z-direction component includes a magnetoresistive element located on a slope formed on a substrate.

The magnetic sensor described in US 2015/0192432 A1 has a problem that the detection accuracy can drop due to an unnecessary magnetic field occurring from the soft magnetic body and the magnetic hysteresis characteristics of the soft magnetic body.

Next, a problem with the devices described in JP H09-219546 A, US 2008/0169807 A1, and US 2018/0275218 A1 will be described. The sensor for detecting the Z-direction component in US 2008/0169807 A1 and US 2018/0275218 A1 will hereinafter be referred to as a Z-direction sensor. The magnetic field applied to the magnetoresistive element in JP H09-219546 A and the magnetic field applied to the Z-direction sensor in US 2008/0169807 A1 and US 2018/0275218 A1 will each be referred to as an applied magnetic field. The component of the applied magnetic field to which the magnetoresistive element according to JP H09-219546 A has sensitivity and the component of the applied magnetic field to which the Z-direction sensor according to US 2008/0169807 A1 and US 2018/0275218 A1 has sensitivity will each be referred to as a sensitivity component.

The strength of the applied magnetic field can vary due to reasons such as variations in the arrangement of the constituent parts of the device. The devices described in JP H09-219546 A, US 2008/0169807 A1, and US 2018/0275218 A1 have a problem that the detection accuracy drops greatly relative to variations in the strength of the applied magnetic field. A detailed description thereof is given below.

The lower the strength of the sensitivity component, the greater the degree of drop in the detection accuracy relative to variations in the strength of the applied magnetic field. In the device described in JP H09-219546 A, the direction of the applied magnetic field changes within the plane of variation of the magnetic field perpendicular to the slope. In the device, the direction of the applied magnetic field can thus be perpendicular to the slope, i.e., direction to which the magnetoresistive element has no sensitivity. In such a device, the strength of the sensitivity component can be zero.

In the devices described in US 2008/0169807 A1 and US 2018/0275218 A1, the direction of the applied magnetic field can be perpendicular to the slope, i.e., direction to which the Z-direction sensor has no sensitivity. In such devices, the strength of the sensitivity component can be zero.

In the devices described in JP H09-219546 A, US 2008/0169807 A1, and US 2018/0275218 A1, the detection accuracy can drop greatly relative to variations in the strength of the applied magnetic field if the direction of the applied magnetic field is such that the strength of the sensitivity component has a value of zero or near zero in particular.

SUMMARY OF THE INVENTION

An object of the present invention is to provide a position detection device including a magnetic sensor that detects a magnetic field to be detected and generates a detection value, in which the detection value can be generated while suppressing a drop in detection accuracy even if the magnetic sensor includes a magnetoresistive element suitable to detect a magnetic field that changes in direction within a predetermined plane and the direction of the magnetic field to be detected changes within a variable range including a direction outside the predetermined plane.

A position detection device according to a first aspect of the present invention includes a magnetic field generator that generates a magnetic field to be detected, and a magnetic sensor. The magnetic sensor detects the magnetic field to be detected and generates a detection value corresponding to a relative position of the magnetic field generator with respect to the magnetic sensor. The magnetic field to be detected has a first direction at a reference position within a first plane. The magnetic field generator and the magnetic sensor are configured such that as the relative position of the magnetic field generator with respect to the magnetic sensor changes, the first direction changes within a predetermined variable range in the first plane.

The magnetic sensor includes at least one magnetoresistive element. The at least one magnetoresistive element each includes a first magnetic layer having first magnetization that can change in direction within a second plane corresponding to the at least one magnetoresistive element. The first plane and the second plane intersect at a dihedral angle other than 90°. The magnetic field to be detected received by each of the at least one magnetoresistive element can be divided into an in-plane component parallel to the second plane and a perpendicular component perpendicular to the second plane. The in-plane component has a second direction that changes with a change in the first direction. The direction of the first magnetization changes with a change in the second direction. The detection value depends on the direction of the first magnetization.

In the position detection device according to the first aspect of the present invention, the first magnetic layer may have a characteristic that the first magnetization is saturated by the magnetic field to be detected if the first direction is in at least a part of the variable range.

In the position detection device according to the first aspect of the present invention, the at least one magnetoresistive element may each further include a second magnetic layer having second magnetization in a direction parallel to the second plane, and a gap layer located between the first magnetic layer and the second magnetic layer.

In the position detection device according to the first aspect of the present invention, the dihedral angle may be in a range of 30° to 84°.

In the position detection device according to the first aspect of the present invention, the magnetic sensor may further include a substrate that supports the at least one magnetoresistive element. The substrate may include a main surface perpendicular to the first plane and at least one slope oblique to the main surface. The at least one magnetoresistive element may be located on the at least one slope. The second plane corresponding to each of the at least one magnetoresistive element may be parallel to the slope on which each of the at least one magnetoresistive element is located.

If the magnetic sensor includes the aforementioned substrate, the magnetic sensor may include, as the at least one magnetoresistive element, a first magnetoresistive element and a second magnetoresistive element. The substrate may include, as the at least one slope, a first slope on which the first magnetoresistive element is located and a second slope on which the second magnetoresistive element is located. In this case, the second plane corresponding to the first magnetoresistive element is parallel to the first slope, and the second plane corresponding to the second magnetoresistive element is parallel to the second slope.

If the magnetic sensor includes the first and second magnetoresistive elements, the magnetic sensor may further include a signal output node. The first and second magnetoresistive elements may be connected in series via the signal output node. In this case, the detection value may depend on a potential of the signal output node.

In the position detection device according to the first aspect of the present invention, the relative position of the magnetic field generator with respect to the magnetic sensor may be able to change so that a distance between the magnetic sensor and the magnetic field generator changes.

In the position detection device according to the first aspect of the present invention, the magnetic field generator may be a magnet. The relative position of the magnetic field generator with respect to the magnetic sensor may be able to change so that a predetermined point in the magnet moves within a linear range of movement. The range of movement may lie in a plane parallel to the first plane. The magnet may be magnetized in a direction parallel to the first plane.

A position detection device according to a second aspect of the present invention includes a magnet that generates a magnetic field to be detected, and a magnetic sensor. The magnetic sensor detects the magnetic field to be detected and generates a detection value corresponding to a relative position of the magnet with respect to the magnetic sensor. The magnetic sensor includes a magnetoresistive element and a substrate that supports the magnetoresistive element. The substrate includes a main surface including a flat surface, and a slope oblique to the main surface.

In the position detection device according to the second aspect of the present invention, the magnetoresistive element is located on the slope. The magnetoresistive element includes a first magnetic layer having first magnetization that can change in direction with a direction of the magnetic field to be detected received by the magnetoresistive element within a reference plane parallel to the slope. The relative position of the magnet with respect to the magnetic sensor can change so that a predetermined point in the magnet moves within a linear range of movement. The range of movement lies in a vertical plane perpendicular to the main surface. The magnet is magnetized in a direction parallel to the vertical plane. The vertical plane and the reference plane intersect at a dihedral angle other than 90°.

In the position detection device according to the first aspect of the present invention, the first plane and the second plane intersect at a dihedral angle other than 90°. This prevents the strength of the in-plane component from becoming zero regardless of the first direction within the variable range as long as there is a magnetic field to be detected. According to the position detection device of the first aspect, the detection value can thus be generated while suppressing a drop in the detection accuracy even if the magnetic sensor includes a magnetoresistive element suitable to detect a magnetic field that changes in direction within a predetermined plane and the direction of the magnetic field to be detected changes within a variable range including a direction outside the predetermined plane.

In the position detection device according to the second aspect of the present invention, the range of movement lies in the vertical plane, the magnet is magnetized in a direction parallel to the vertical plane, and the vertical plane and the reference plane intersect at a dihedral angle other than 90°. This prevents the strength of a component of a magnetic field to be detected parallel to the reference plane from becoming zero as long as there is the magnetic field to be detected. According to the position detection device of the second aspect, the detection value can thus be generated while suppressing a drop in the detection accuracy even if the magnetic sensor includes a magnetoresistive element suitable to detect a magnetic field that changes in direction within a predetermined plane and the direction of the magnetic field to be detected changes within a variable range including a direction outside the predetermined plane.

Other and further objects, features and advantages of the present invention will appear more fully from the following description.

DETAILED DESCRIPTION OF THE PREFERRED EMBODIMENTS

First Embodiment

Figure 1:
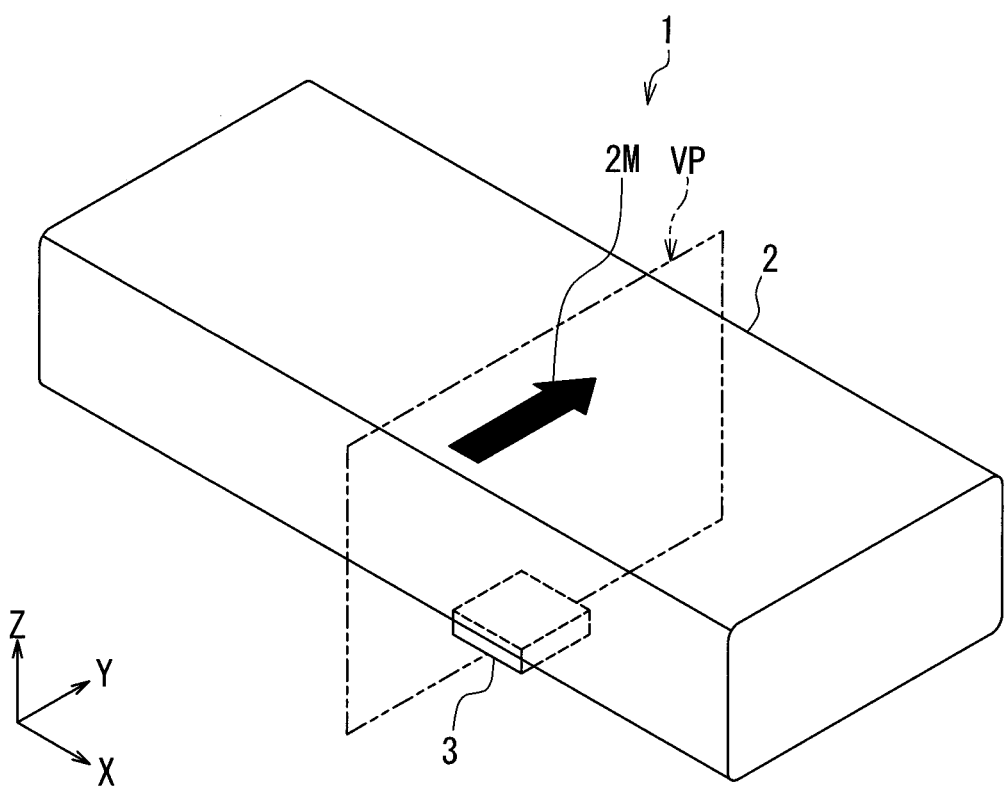
FIG. 1 is a perspective view showing a position detection device according to a first embodiment of the invention.
Figure 2:
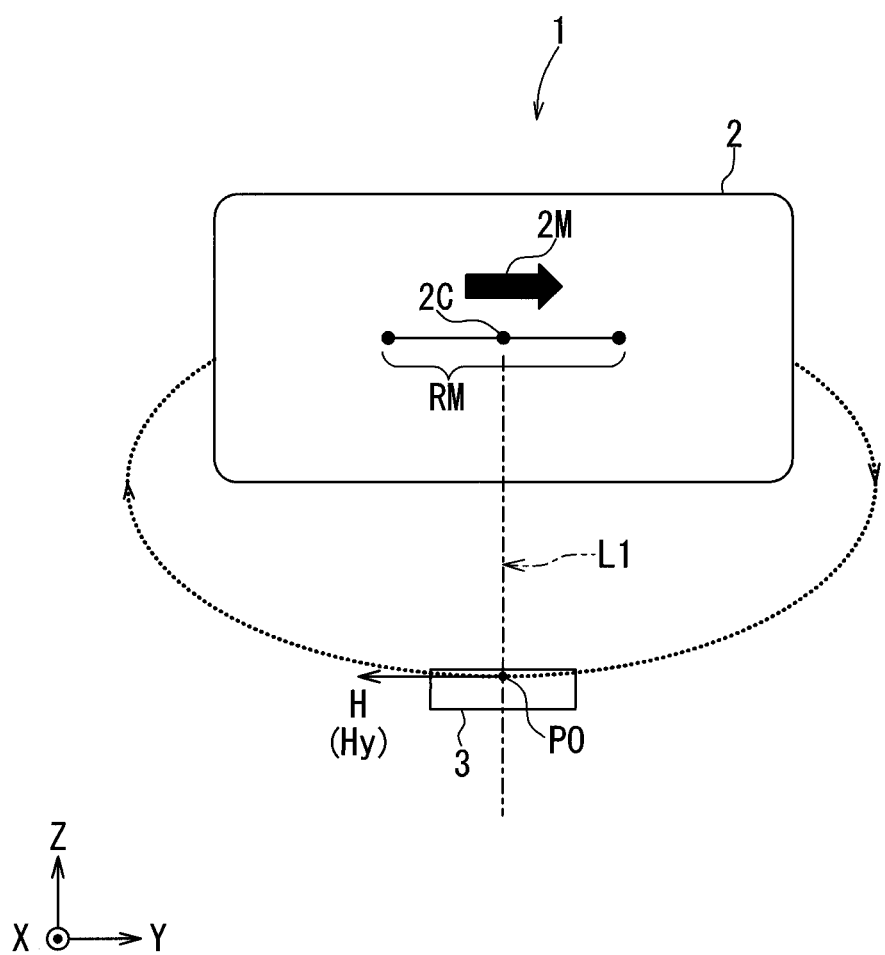
FIG. 2 is a sectional view showing the position detection device according to the first embodiment of the invention.

Preferred embodiments of the present invention will now be described in detail with reference to the drawings. Initially, a position detection device according to a first embodiment of the invention will be outlined with reference to FIGS. 1 and 2. As shown in FIGS. 1 and 2, a position detection device 1 according to the present embodiment includes a magnetic field generator 2 that generates a magnetic field to be detected and a magnetic sensor 3. The magnetic sensor 3 detects the magnetic field to be detected and generates a detection value θs corresponding to a relative position of the magnetic field generator 2 with respect to the magnetic sensor 3. In particular, in the present embodiment, the magnetic field generator 2 is a magnet. The magnet will hereinafter be also denoted by the reference numeral 2. A description of the magnet 2 applies to the magnetic field generator 2 as well.

As will be described in detail later, the magnetic sensor 3 includes at least one magnetoresistive element (hereinafter, referred to as an MR element) and a substrate that supports the at least one MR element. The substrate includes a main surface including a flat surface and at least one slope oblique to the main surface.

X, Y, and Z directions are defined here as shown in FIGS. 1 and 2. The X, Y and Z directions are mutually orthogonal directions. In the present embodiment, the Z direction is a direction perpendicular to the main surface of the substrate in the upward direction in FIGS. 1 and 2. The X and Y directions are both parallel to the main surface of the substrate. The opposite directions to the X, Y, and Z directions are defined as −X, −Y, and −Z directions, respectively. As used hereinafter, the term "above" refers to positions located forward of a reference position in the Z direction, and "below" refers to positions opposite from the "above" positions with respect to the reference position. The magnet 2 lies above the magnetic sensor 3.

A relative position of the magnet 2 with respect to the magnetic sensor 3 can change so that a predetermined point in the magnet 2 moves within a linear range of movement RM. The relative position of the magnet 2 with respect to the magnetic sensor 3 will hereinafter be referred to simply as the position of the magnet 2. The predetermined point in the magnet 2 will be referred to as a position reference point and denoted by the reference numeral 2C. In particular, in the present embodiment, the position of the magnet 2 can change so that a distance between the magnetic sensor 3 and the magnet 2 changes. For example, the position reference point 2C may be a point inside the magnet 2 like the center of gravity of the magnet 2, or a point on the surface of the magnet 2. In the following description, the center of gravity of the magnet 2 is assumed as the position reference point 2C.

The range of movement RM lies in a vertical plane VP perpendicular to the main surface. The vertical plane VP is shown in FIG. 1. FIG. 2 shows a cross section taken along the vertical plane VP. In particular, in the present embodiment, the vertical plane VP refers to a YZ plane. The range of movement RM is represented by a line segment parallel to the Y direction. The magnet 2 is magnetized in a direction parallel to the vertical plane VP. In particular, in the present embodiment, the magnet 2 is magnetized in the Y direction. In FIGS. 1 and 2, the arrow denoted by the reference numeral 2M indicates the direction of magnetization of the magnet 2. In FIG. 2, the dotted line represents a part of a magnetic flux corresponding to the magnetic field to be detected.

The magnetic field to be detected has a first direction at a reference position within a first plane. The magnet 2 and the magnetic sensor 3 are configured such that, as the position of the magnet 2 changes, the first direction changes within a predetermined variable range in the first plane. In the present embodiment, the first plane refers to a YZ plane intersecting the magnet 2 and the magnetic sensor 3. The first plane may coincide with the vertical plane VP. In the following description, the first plane is assumed to coincide with the vertical plane VP.

Figure 3:
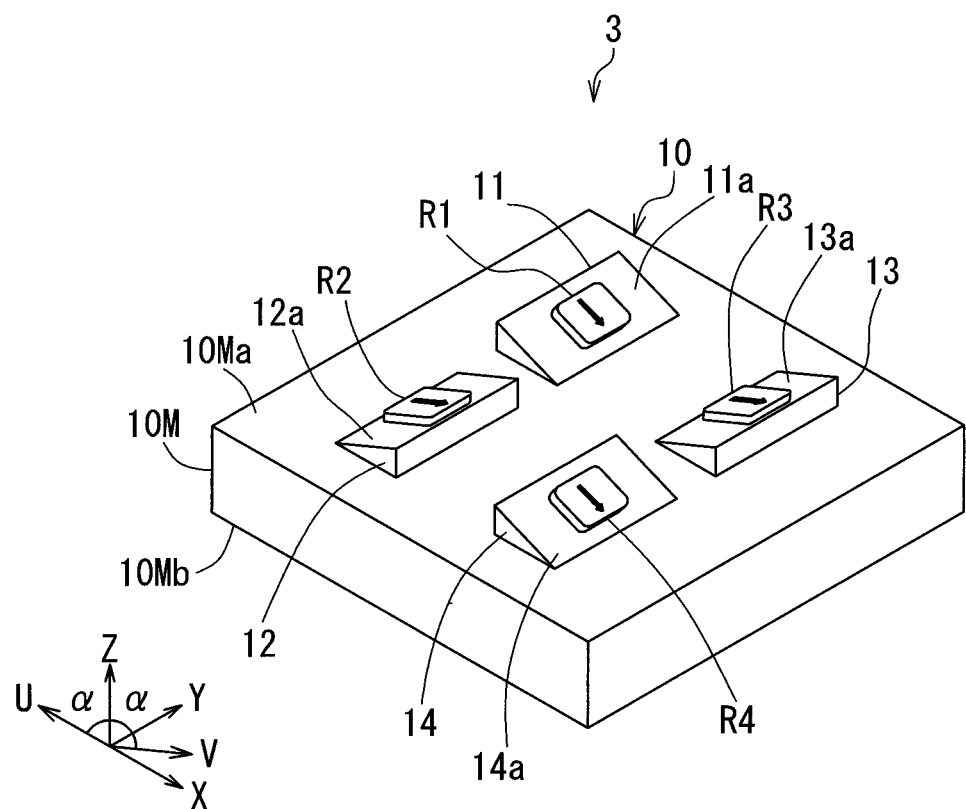
FIG. 3 is a perspective view showing an example configuration of a magnetic sensor of the first embodiment of the invention.
Figure 4:
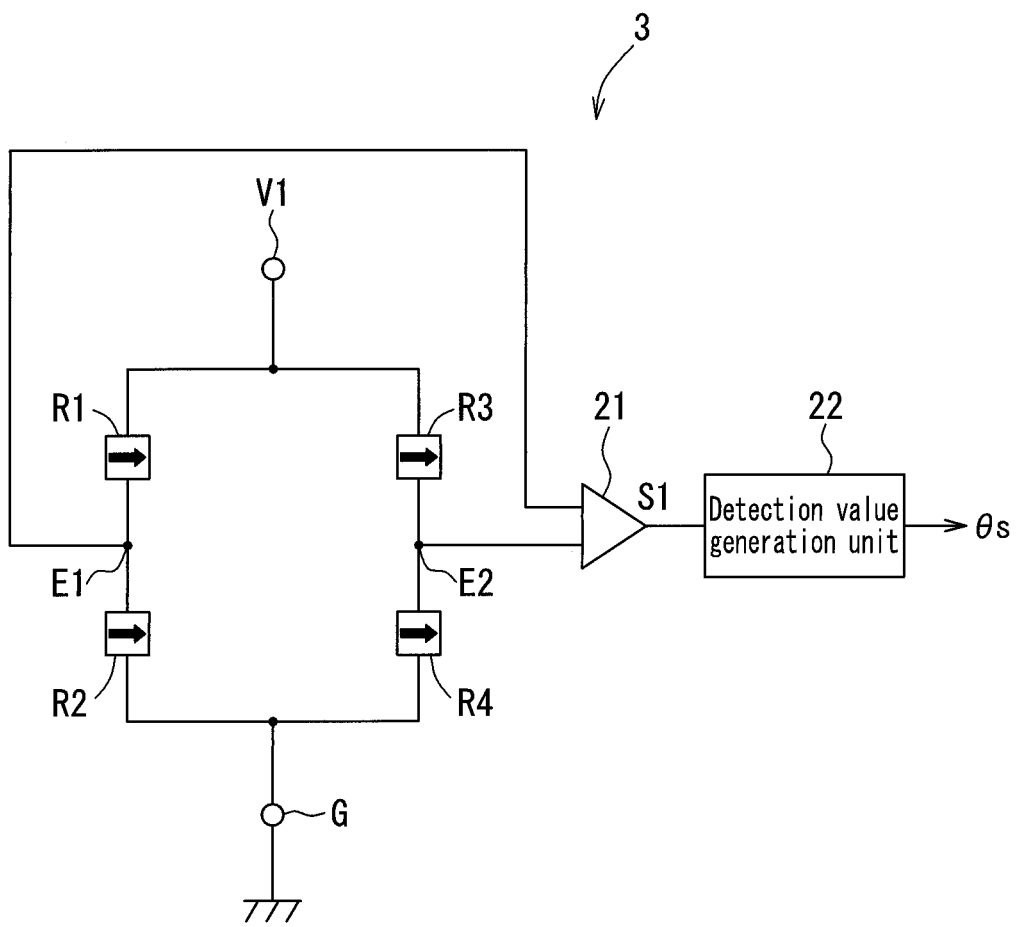
FIG. 4 is a circuit diagram showing an example circuit configuration of the magnetic sensor of the first embodiment of the invention.

Next, an example configuration of the magnetic sensor 3 will now be described with reference to FIGS. 3 and 4. FIG. 3 is a perspective view showing the example configuration of the magnetic sensor 3. FIG. 4 is a circuit diagram showing an example circuit configuration of the magnetic sensor 3. In this example, as shown in FIG. 3, the magnetic sensor 3 includes four MR elements R1, R2, R3 and R4, and a substrate 10 that supports the four MR elements R1, R2, R3 and R4. The substrate 10 includes a flat-shaped main body 10M and four protrusions 11, 12, 13, and 14. The main body 10M has a top surface 10Ma and a bottom surface 10Mb that are flat surfaces. The top surface 10Ma lies at the end of the main body 10M in the Z direction. The bottom surface 10Mb lies at the end of the main body 10M in the −Z direction. Both the top surface 10Ma and the bottom surface 10Mb are the XY plane, and correspond to the foregoing main surface.

The four protrusions 11, 12, 13, and 14 are provided so as to protrude upward from the top surface 10Ma. Each of the protrusions 11, 12, 13, and 14 includes a slope 11a, 12a, 13a, and 14a oblique to the top surface 10Ma that is the main surface.

Suppose here that α is an angle greater than 0° and smaller than 90°. A direction rotated from the Z direction toward the −X direction by α will be referred to as a U direction. The direction opposite to the U direction will be referred to as a −U direction. A direction rotated from the Z direction toward the X direction by α will be referred to as a V direction. The direction opposite to the V direction will be referred to as a −V direction.

Both the slopes 11a and 14a are planes parallel to the U direction and the Y direction, i.e., UY planes. Both the slopes 12a and 13a are planes parallel to the V direction and the Y direction, i.e., VY planes.

The MR elements R1, R2, R3, and R4 are located on the slopes 11a, 12a, 13a, and 14a, respectively. In describing an arbitrary one of the MR elements R1, R2, R3, and R4, the MR element will hereinafter be denoted by the symbol R. An MR element R includes a first magnetic layer having first magnetization that can change in direction within a corresponding second plane. The magnetic field to be detected received by the MR element R can be divided into an in-plane component parallel to the second plane and a perpendicular component perpendicular to the second plane. The foregoing first and second planes intersect at a dihedral angle other than 90°. In the present embodiment, the dihedral angle is represented by the foregoing α.

In the present embodiment, the second plane is also referred to as a reference plane. There is a reference plane for each of the respective MR elements R. In terms of the reference plane, the first magnetic layer of an MR element R can be said to have first magnetization that can change in direction within the reference plane corresponding to the MR element R. The foregoing vertical plane VP and the reference plane intersect at a dihedral angle of α.

The MR element R may be a spin valve MR element or an anisotropic MR element. In particular, in the present embodiment, the MR element R is a spin valve MR element. In this case, the MR element R includes a second magnetic layer and a gap layer aside from the foregoing first magnetic layer. The second magnetic layer has second magnetization in a direction parallel to the second plane corresponding to each of the MR elements R. The gap layer is located between the first and second magnetic layers. The direction of the second magnetization does not change. The spin-valve MR element may be a tunneling magnetoresistive (TMR) element or a giant magnetoresistive (GMR) element. In the TMR element, the gap layer is a tunnel barrier layer. In the GMR element, the gap layer is a nonmagnetic conductive layer. The resistance of the MR element R changes with an angle that the direction of the first magnetization of the first magnetic layer forms with respect to the direction of the second magnetization of the second magnetic layer. The resistance is minimized if the angle is 0°. The resistance is maximized if the angle is 180°. In FIGS. 3 and 4, the thick arrow indicates the direction of the second magnetization.

In the present embodiment, the directions of the second magnetization in the MR elements R1 and R4 are the −U direction. The directions of the second magnetization in the MR elements R2 and R3 are the V direction. From the viewpoint of the manufacturing accuracy of the MR element R, the directions of the second magnetization may be slightly different from the foregoing direction.

The second plane corresponding to the MR element R1 is parallel to the slope 11a on which the MR element R1 is located. The second plane corresponding to the MR element R2 is parallel to the slope 12a on which the MR element R2 is located. The second plane corresponding to the MR element R3 is parallel to the slope 13a on which the MR element R3 is located. The second plane corresponding to the MR element R4 is parallel to the slope 14a on which the MR element R4 is located. A relationship between the second planes corresponding to the respective MR elements R1, R2, R3, and R4 and the first plane will be described in more detail later.

The substrate 10 may include four grooves in the top surface 10Ma instead of the four protrusions 11, 12, 13, and 14. The four grooves include the respective slopes 11a, 12a, 13a, and 14a.

As shown in FIG. 4, the magnetic sensor 3 further includes a power supply node V1, a ground node G, a first signal output node E1 and a second signal output node E2. The MR element R1 and the MR element R2 are connected in series via the first signal output node E1. The MR element R1 is arranged between the power supply node V1 and the first signal output node E1. The MR element R2 is arranged between the first signal output node E1 and the ground node G The MR element R3 and the MR element R4 are connected in series via the second signal output node E2. The MR element R3 is arranged between the power supply node V1 and the second signal output node E2. The MR element R4 is arranged between the second signal output node E2 and the ground node G A predetermined magnitude of power supply voltage is applied to the power supply node V1. The ground node G is grounded.

The magnetic sensor 3 further includes a differential detector 21 and a detection value generation unit 22. The differential detector 21 outputs a detection signal S1 corresponding to a potential difference between the signal output nodes E1 and E2. The detection value generation unit 22 generates the detection value θs on the basis of the detection signal S1. The detection value generation unit 22 includes an application specific integrated circuit (ASIC) or a microcomputer, for example.

Figure 5:
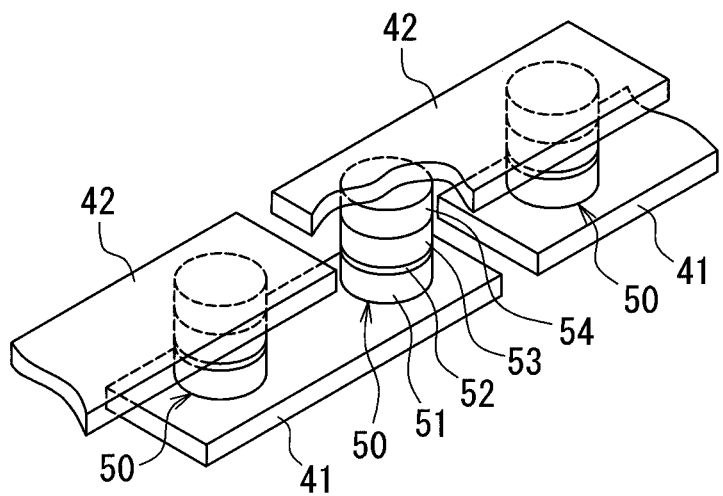
FIG. 5 is a perspective view showing a part of a magnetoresistive element of the first embodiment of the invention.

An example of the configuration of the MR element R will now be described with reference to FIG. 5. FIG. 5 is a perspective view showing a part of the MR element R. In this example, the MR element R includes a plurality of lower electrodes 41, a plurality of MR films 50 and a plurality of upper electrodes 42. The plurality of lower electrodes 41 are located on the slope on which the MR element R is located. Each of the lower electrodes 41 has a long slender shape. Every two lower electrodes 41 adjacent to each other in the longitudinal direction of the lower electrodes 41 have a gap therebetween. As shown in FIG. 5, MR films 50 are provided on the top surfaces of the lower electrodes 41, near opposite ends in the longitudinal direction. Each of the MR films 50 includes a first magnetic layer 51, a gap layer 52, a second magnetic layer 53, and an antiferromagnetic layer 54 which are stacked in this order, the first magnetic layer 51 being closest to the lower electrode 41. The first magnetic layer 51 is electrically connected to the lower electrode 41. The antiferromagnetic layer 54 is formed of an antiferromagnetic material. The antiferromagnetic layer 54 is in exchange coupling with the second magnetic layer 53 so as to pin the magnetization direction of the second magnetic layer 53. The plurality of upper electrodes 42 are arranged over the plurality of MR films 50. Each of the upper electrodes 42 has a long slender shape, and establishes electrical connection between the respective antiferromagnetic layers 54 of two adjacent MR films 50 that are arranged on two lower electrodes 41 adjacent in the longitudinal direction of the lower electrodes 41. With such a configuration, the plurality of MR films 50 in the MR element R shown in FIG. 5 are connected in series by the plurality of lower electrodes 41 and the plurality of upper electrodes 42. It should be appreciated that the layers 51 to 54 of the MR films 50 may be stacked in an order reverse to that shown in FIG. 5.

Figure 6:
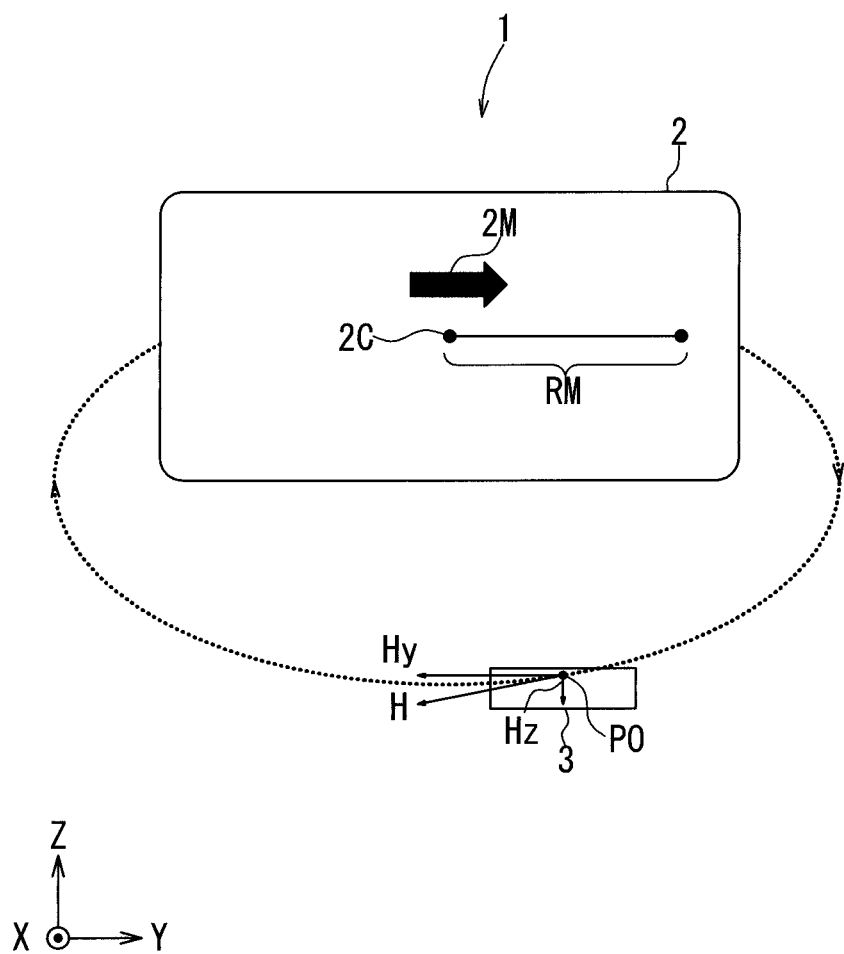
FIG. 6 is an explanatory diagram for describing a relationship between a magnet position and a magnetic field to be detected in the first embodiment of the invention.
Figure 7:
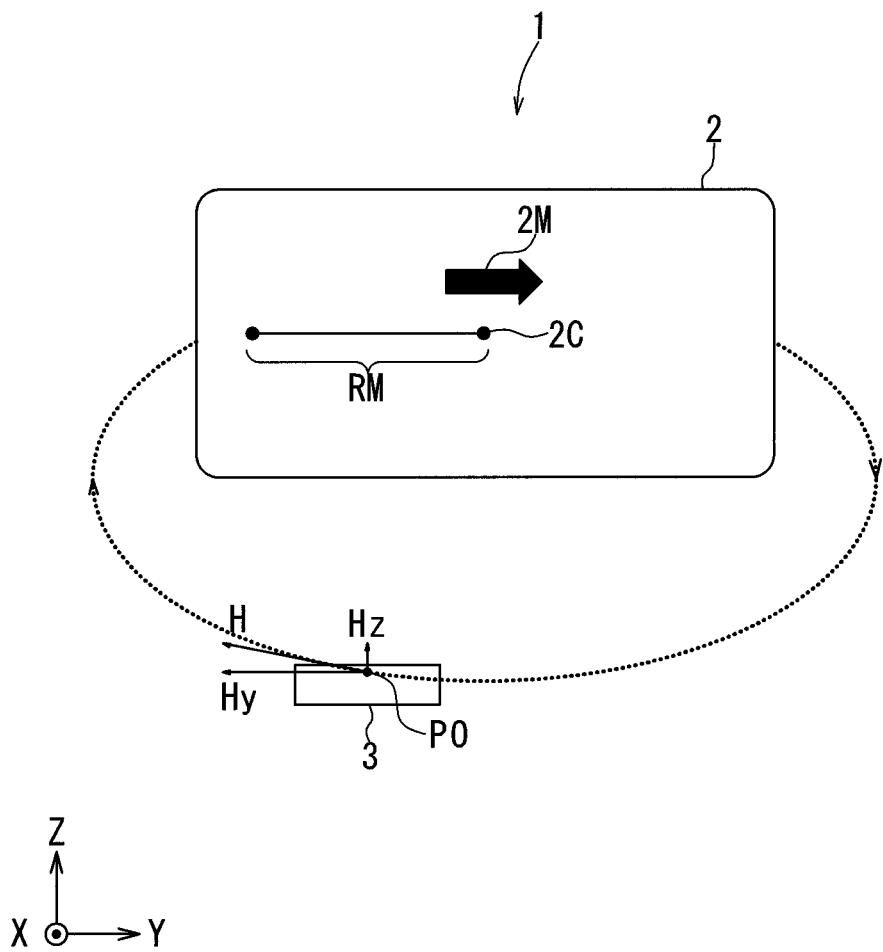
FIG. 7 is an explanatory diagram for describing the relationship between the magnet position and the magnetic field to be detected in the first embodiment of the invention.

Next, the relationship between the position of the magnet 2 and the magnetic field to be detected will be described with reference to FIGS. 2, 6, and 7. In the following description, the position of the magnet 2 will be represented by the position of the position reference point 2C. In such a case, the range of movement RM can be said to be the range of movement of the position of the magnet 2. FIG. 2 shows a state where the magnet 2 lies at the center of the range of movement RM. FIG. 6 shows a state where the magnet 2 lies at the end in the −Y direction of the range of movement RM. FIG. 7 shows a state where the magnet 2 lies at the end in the Y direction of the range of movement RM.

The reference position in the first plane will hereinafter be denoted by the symbol P0, and the magnetic field to be detected at the reference position P0 will be denoted by the symbol H. As shown in FIG. 2, in the present embodiment, the center point in the range of movement RM falls on a virtual line L1 that passes through the reference position P0 and is parallel to the Z direction.

As shown in FIGS. 2, 6, and 7, the magnetic field to be detected H can be divided into a first component Hz in a direction parallel to the Z direction and a second component Hy in a direction parallel to the Y direction. In the state shown in FIG. 2, the first component Hz is 0 and the second component Hy is equal to the magnetic field to be detected H. As the position of the magnet 2 changes, the direction of the magnetic field to be detected H, i.e., the first direction changes. The first direction will hereinafter be denoted by the symbol D1. An angle that the first direction D1 forms with respect to a predetermined reference direction will be referred to as a first angle and denoted by the symbol θ1. In the present embodiment, the reference direction is the Z direction. The first angle θ1 is expressed in positive values when seen in a direction of rotation from the Z direction to the Y direction, and expressed in negative values when seen in a direction of rotation from the Z direction to the −Y direction. As the position of the magnet 2 changes, the first angle θ1 changes. The first angle θ1 thus has a correlation with the position of the magnet 2.

Figure 8:
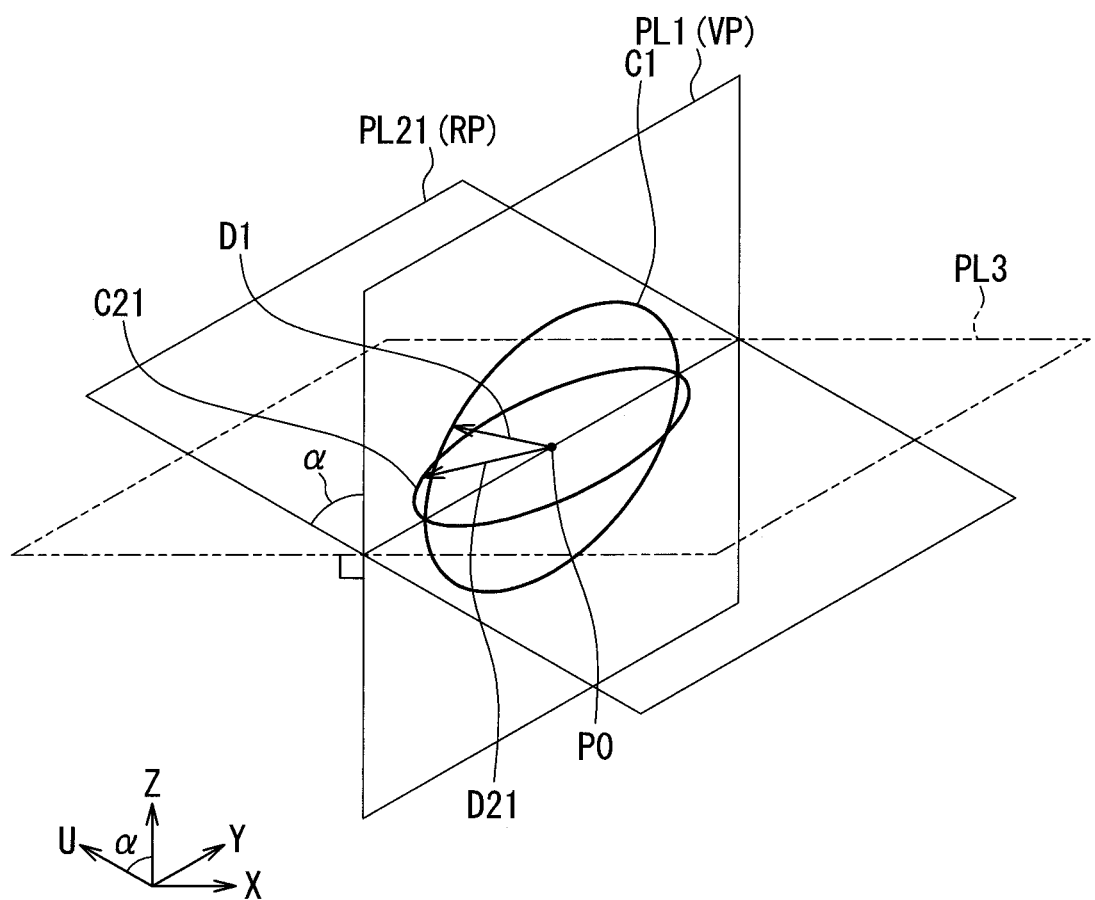
FIG. 8 is an explanatory diagram for describing a first plane and a second plane in the first embodiment of the invention.
Figure 9:
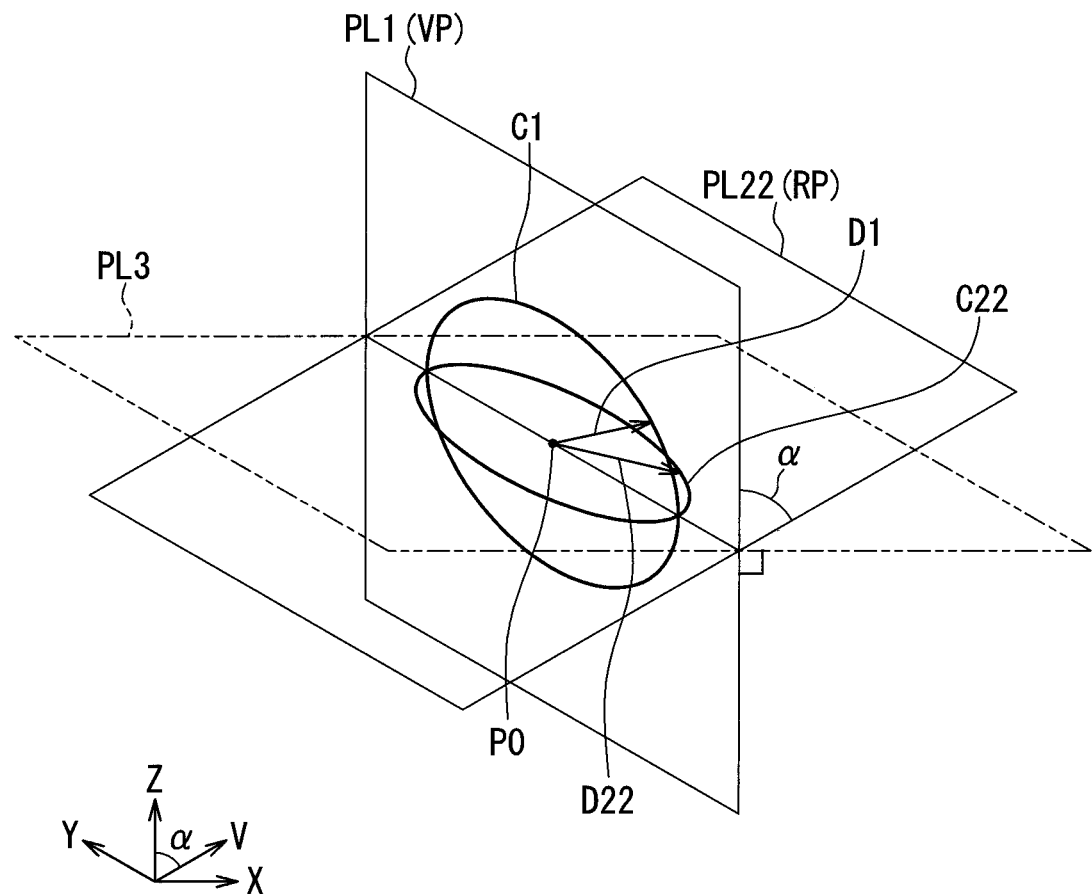
FIG. 9 is an explanatory diagram for describing the first plane and the second plane in the first embodiment of the invention.

Next, the relationship between the second planes corresponding to the respective MR elements R1, R2, R3, and R4 and the first plane will be described with reference to FIGS. 8 to 12. The first plane will hereinafter be denoted by the symbol PL1. The second planes corresponding to the MR elements R1 and R4 will be both denoted by the symbol PL21. The second planes corresponding to the MR elements R2 and R3 will be both denoted by the symbol PL22. FIG. 8 shows the first plane PL1 and a second plane PL21. FIG. 9 shows the first plane PL1 and a second plane PL22. For the sake of convenience, in FIGS. 8 and 9, the second planes PL21 and PL22 are shown to pass the reference position P0. However, the second planes PL21 and PL22 do not necessarily pass the reference position P0. In FIGS. 8 and 9, a plane denoted by the symbol PL3 represents an XY plane passing the reference position P0. This plane will hereinafter be referred to as a third plane.

The MR elements R1, R2, R3 and R4 are located within an area where no substantial difference occurs in the direction of the magnetic field to be detected depending on the positions where the plurality of MR elements receive the magnetic field to be detected. The directions of the magnetic field to be detected received by the MR elements R1, R2, R3 and R4 are thus substantially the same as the direction of the magnetic field to be detected H at the reference position P0, i.e., the first direction D1.

As the position of the magnet 2 changes within the range of movement RM, the first direction D1 changes within a predetermined variable range in the first plane PL1. In FIGS. 8 and 9, the arrow denoted by the symbol D1 represents the first direction D1 and the strength of the magnetic field to be detected H at the reference position P0. The end of the arrow denoted by the symbol D1 moves along a circle denoted by the symbol C1. In the present embodiment, the variable range of the first direction D1 is 180° or less in size. The variable range of the first angle θ1 is from −180° to 0° at maximum.

As shown in FIG. 8, the second plane PL21 is a plane parallel to the U direction and the Y direction, i.e., a UY plane. The second plane PL21 is oblique to both the first plane PL1 and the third plane PL3. The first plane PL1 and the second plane PL21 intersect at a dihedral angle α other than 90°. The second plane PL21 is a plane obtained by rotating the XY plane about an axis in the Y direction by an angle of 90°−α.

In the present embodiment, the first plane PL1 coincides with the vertical plane VP shown in FIG. 1. The second plane PL21 represents the reference plane corresponding to each of the MR elements R1 and R4. Hereinafter, a reference plane will be denoted by the symbol RP. As shown in FIG. 8, the vertical plane VP and the reference plane RP corresponding to each of the MR elements R1 and R4 intersect at a dihedral angle of α.

The in-plane component on the second plane PL21 has a second direction D21 that changes with a change in the first direction D1. In FIG. 8, the arrow denoted by the symbol D21 represents the second direction D21 and the strength of the in-plane component on the second plane PL21. The end of the arrow denoted by the symbol D21 moves along an ellipse denoted by the symbol C21. The second direction D21 and the ellipse C21 are orthogonal projections of the first direction D1 and the circle C1 upon the second plane PL21, respectively.

As shown in FIG. 9, the second plane PL22 is a plane parallel to the V direction and the Y direction, i.e., a VY plane. The second plane PL22 is oblique to both the first plane PL1 and the third plane PL3. The first plane PL1 and the second plane PL22 intersect at a dihedral angle α other than 90°. The second plane PL22 is a plane obtained by rotating the XY plane about an axis in the Y direction by an angle of 90°−α. The second plane PL22 is symmetrical with the second plane PL21 about the YZ plane.

In the present embodiment, the second plane PL22 represents the reference plane RP corresponding to each of the MR elements R2 and R3. As shown in FIG. 9, the vertical plane VP and the reference plane RP corresponding to each of the MR elements R2 and R3 intersect at a dihedral angle of a.

The in-plane component on the second plane PL22 has a second direction D22 that changes with a change in the first direction D1. In FIG. 9, the arrow denoted by the symbol D22 represents the second direction D22 and the strength of the in-plane component on the second plane PL22. The end of the arrow denoted by the symbol D22 moves along an ellipse denoted by the symbol C22. The second direction D22 and the ellipse C22 are orthogonal projections of the first direction D1 and the circle C1 upon the second plane PL22, respectively.

An angle θ21 that the second direction D21 forms with respect to the U direction is equal to an angle θ22 that the second direction D22 forms with respect to the V direction. Both the angles θ21 and θ22 will hereinafter be referred to as a second angle.

Figure 10:
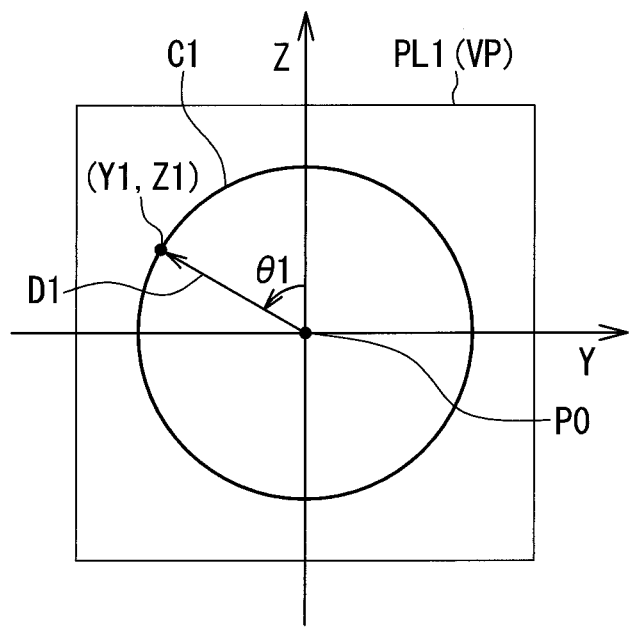
FIG. 10 is an explanatory diagram for describing a first direction and a first angle in the first embodiment of the invention.
Figure 11:
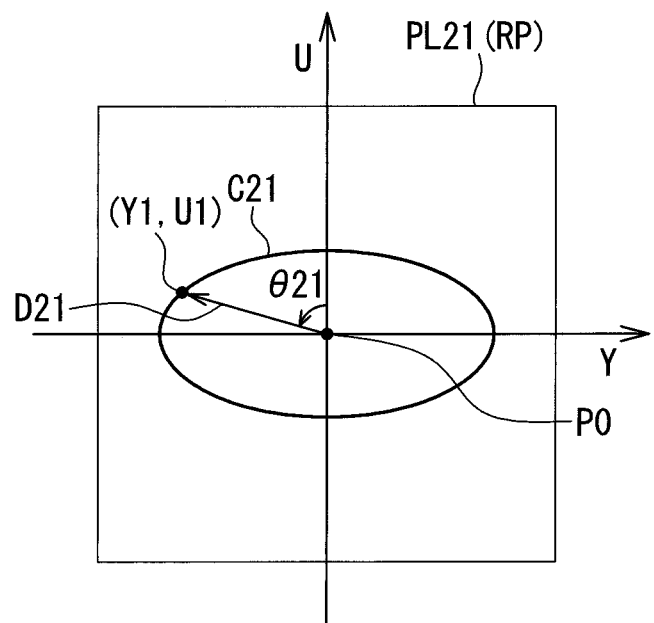
FIG. 11 is an explanatory diagram for describing a second direction and a second angle in the first embodiment of the invention.
Figure 12:
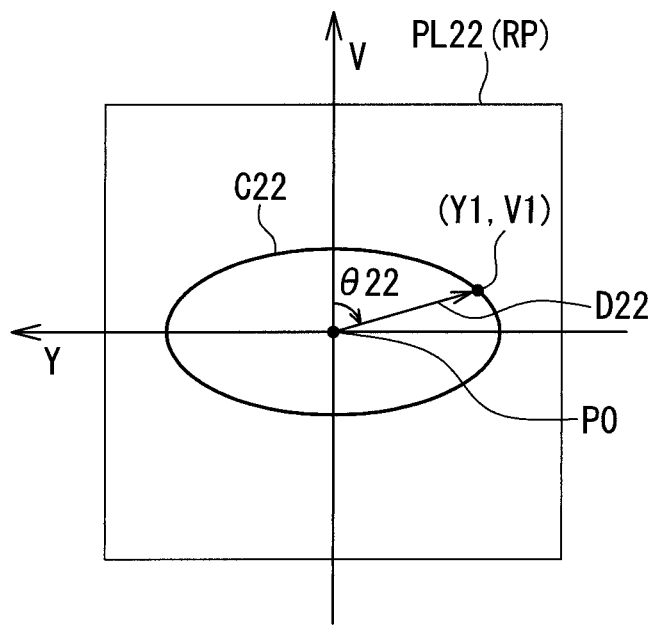
FIG. 12 is an explanatory diagram for describing the second direction and the second angle in the first embodiment of the invention.

FIG. 10 shows the first direction D1, the first angle θ1, and the circle C1. FIG. 11 shows the second direction D21, the second angle θ21, and the ellipse C21. FIG. 12 shows the second direction D22, the second angle θ22, and the ellipse C22.

The second angle θ21 is expressed in positive values when seen in a direction of rotation from the U direction to the Y direction, and expressed in negative values when seen in a direction of rotation from the U direction to the −Y direction. The second angle θ22 is expressed in positive values when seen in a direction of rotation from the V direction to the Y direction, and expressed in negative values when seen in a direction of rotation from the V direction to the −Y direction. The second angles θ21 and θ22 have a correlation with the first angle θ1. In the present embodiment, the variable range of the second directions D21 and D22 is 180° or less in size. The variable range of the second angles θ21 and θ22 is from −180° to 0° at maximum.

If the first angle θ1 is −180°, the second angles θ21 and θ22 are also −180°. If the first angle θ1 is −90°, the second angles θ21 and θ22 are also −90°. If the first angle θ1 is 0°, the second angles θ21 and θ22 are also 0°.

Next, a relationship between the first angle θ1, the second angles θ21 and θ22, and the detection signal S1 will be described. The directions of the first magnetization in the first magnetic layers of the respective MR elements R1 and R4 change with a change in the second direction D21, i.e., a change in the second angle θ21. The resistances of the respective MR elements R1 and R4 depend on the directions of the first magnetization. The resistances of the respective MR elements R1 and R4 therefore change with a change in the second angle θ21. The resistances of the MR elements R1 and R4 thus depend on the directions of the first magnetization in the first magnetic layers of the respective MR elements R1 and R4 and the second angle θ21.

The directions of the first magnetization in the first magnetic layers of the respective MR elements R2 and R3 change with a change in the second direction D22, i.e., a change in the second angle θ22. The resistances of the respective MR elements R2 and R3 depend on the directions of the first magnetization. The resistances of the respective MR elements R2 and R3 therefore change with a change in the second angle θ22. The resistances of the MR elements R2 and R3 thus depend on the directions of the first magnetization in the first magnetic layers of the respective MR elements R2 and R3 and the second angle θ22.

In the magnetic sensor 3 shown in FIGS. 3 and 4, the resistances of the MR elements R1 and R4 are minimized and the resistances of the MR elements R2 and R3 are maximized if the second angles θ21 and θ22 are −180°. The resistances of the MR elements R1 and R4 are maximized and the resistances of the MR elements R2 and R3 are minimized if the second angles θ21 and θ22 are 0°.

As described above, the second angles θ21 and θ22 have a correlation with the first angle θ1. The resistances of the MR elements R1, R2, R3, and R4 therefore depend on the first angle θ1 as well.

The detection signal S1 corresponds to the potential difference between the signal output nodes E1 and E2. The potential of the signal output node E1 depends on the resistances of the MR elements R1 and R2. The potential of the signal output node E2 depends on the resistances of the MR elements R3 and R4. The detection signal S1 thus depends on the resistances of the MR elements R1, R2, R3, and R4.

Consequently, the detection signal S1 depends on the directions of the first magnetization in the first magnetic layers of the respective MR elements R1, R2, R3, and R4, the first angle θ1, and the second angles θ21 and θ22.

The configuration of the magnetic sensor 3 is not limited to that shown in FIGS. 3 and 4. For example, the magnetic sensor 3 may include the MR elements R1 and R2 without the MR elements R3 and R4. In such a case, a signal corresponding to the potential of the signal output node E1 may be used as the detection signal S1. The detection signal S1 here also depends on the directions of the first magnetization, the first angle θ1, and the second angles θ21 and θ22.

The magnetic sensor 3 may include a resistor having a constant resistance instead of the MR element R1, without the MR elements R3 and R4. In such a case also, a signal corresponding to the potential of the signal output node E1 may be used as the detection signal S1. The detection signal S1 here also depends on the directions of the first magnetization, the first angle θ1, and the second angles θ21 and θ22.

Next, the detection value θs generated by the detection value generation unit 22 will be described. The detection value θs depends on the detection signal S1. As described above, the detection signal S1 depends on the directions of the first magnetization, the first angle θ1, and the second angles θ21 and θ22. The detection value θs thus depends on the directions of the first magnetization, the first angle θ1, and the second angles θ21 and θ22.

In particular, in the present embodiment, the detection value θs is a value indicating the first angle θ1. As described above, the first angle θ1 has a correlation with the position of the magnet 2. The detection value θs thus corresponds to the position of the magnet 2. The detection signal θs may be a value indicating the position of the magnet 2 itself, or a value indicating the second angle θ21 or θ22. As described above, the second angles θ21 and θ22 have a correlation with the first angle θ1, and the first angle θ1 has a correlation with the position of the magnet 2. The second angles θ21 and θ22 thus have a correlation with the position of the magnet 2, and the detection value θs indicating the second angle θ21 or θ22 also has a correlation with the position of the magnet 2.

The method for generating the detection value θs will be specifically described below. Initially, the method for generating the detection value θs will be outlined. The arrow indicating the first direction D1 shown in FIG. 10 can be said to represent a vector representing the direction and strength of the magnetic field to be detected received by the MR element R in the YZ coordinate system with the reference position P0 as the origin. Such a vector will hereinafter be referred to as a first vector D1. The Y component and the Z component of the first vector D1 will be denoted by Y1 and Z1, respectively.

The arrow indicating the second direction D21 shown in FIG. 11 can be said to represent a vector representing the direction and strength of the in-plane component received by each of the MR elements R1 and R4 in the YU coordinate system with the reference position P0 as the origin. Such a vector will hereinafter be referred to as a second vector D21. The second vector D21 is an orthogonal projection of the first vector D1 on the second plane PL21. The Y component of the second vector D21 has the same value as that of the Y component of the first vector D1, i.e., Y1. The Y and U components of the second vector D21 will hereinafter be denoted by Y1 and U1, respectively.

The arrow indicating the second direction D22 shown in FIG. 12 can be said to represent a vector representing the direction and strength of the in-plane component received by each of the MR elements R2 and R3 in the YV coordinate system with the reference position P0 as the origin. Such a vector will hereinafter be referred to as a second vector D22. The second vector D22 is an orthogonal projection of the first vector D1 on the second plane PL22. The Y component of the second vector D22 has the same value as that of the Y component of the first vector D1, i.e., Y1. The Y and U components of the second vector D22 will hereinafter be denoted by Y1 and V1, respectively.

Z1 can be expressed by using U1 and the dihedral angle $\alpha$. The ratio Y1/Z1 can thus be expressed by using the ratio Y1/U1 and the dihedral angle $\alpha$. The ratio Y1/V1 is equal to the ratio Y1/U1. An equation representing a relationship between the first angle θ1 and the second angle θ21 can be obtained by using a relationship between the ratio Y1/Z1 and the first angle θ1, a relationship between the ratio Y1/U1 and the second angle θ21, and a relationship between the ratio Y1/Z1 and the ratio Y1/U1.

A value θ2s representing the second angle θ21 can be determined by using the first detection signal S1. In the present embodiment, the detection value generation unit 22 generates the detection value θs by determining θ2s and substituting θ2s into the equation representing the relationship between the first angle θ1 and the second angle θ21.

Next, a specific method for calculating the detection value θs will be described. The ratio Y1/Z1 and the ratio Y1/U1 are represented by the following Eqs. (1) and (2), respectively:

$$Y1/Z1 = \tan\theta 1, \qquad (1)$$

$$Y1/U1 = \tan\theta 21 \qquad (2)$$

Z1 is represented by the following Eq. (3):

$$Z1 = U1/\cos\alpha \qquad (3)$$

Transforming Eq. (1) and substituting Eqs. (2) and (3) into the transformed equation yields the following Eq. (4):

$$\begin{aligned}\theta 1 &= \operatorname{atan}(Y1/Z1) \\ &= \operatorname{atan}(Y1/(U1/\cos\alpha)) \\ &= \operatorname{atan}(\cos\alpha \cdot Y1/U1) \\ &= \operatorname{atan}(\cos\alpha \cdot \tan\theta 21).\end{aligned} \qquad (4)$$

Eq. (4) represents the relationship between the first angle θ1 and the second angle θ21. The symbol "atan" represents the arctangent.

In the magnetic sensor 3 shown in FIGS. 3 and 4, the detection signal S1 is maximized if the second angles θ21 and θ22 are −180°. The detection signal S1 is minimized if the second angles θ21 and θ22 are 0°.

The detection signal S1 can be normalized such that the detection signal S1 has a value of 1 if the second angle θ21 is −180°, a value of 0 if the second angle θ21 is −90°, and a value of −1 if the second angle θ21 is 0°. In such a case, the detection signal S1 can be represented by the following Eq. (5):

$$S1 = -\cos\theta 21 \qquad (5)$$

Now, first and second examples where the first angle θ1 has different variable ranges will be described. In the first example, the variable range of the first angle θ1 is from −180° to 0°. In the second example, the variable range is greater than −180° and smaller than 0°.

In both the first and second examples, the detection value generation unit 22 calculates the value θ2s by the following Eq. (6):

$$\theta 2s = \operatorname{acos}(-S1). \qquad (6)$$

In the first example, the range of the value θ2s is from −180° to 0°. In the second example, the range of the value θ2s is greater than −180° and smaller than 0°. Eq. (6) is obtained by replacing θ21 in Eq. (5) with θ2s and transforming the resultant. The symbol "acos" represents the arccosine.

In the first example, the detection value generation unit 22 calculates the detection value θs by the following Eq. (7) excluding the exceptions to be described later:

$$\theta s = \operatorname{atan}(\cos\alpha \cdot \tan\theta 2s). \qquad (7)$$

The range of the detection value θs is from −180° to 0°. Eq. (7) is obtained by replacing θ1 and θ21 in Eq. (4) with θs and θ2s respectively and transforming the resultant.

The foregoing exceptions refer to situations where the value θ2s is −180° or 0°. If the value θ2s is −180° or 0°, θs in Eq. (7) has two solutions, −180° or 0°. The detection value generation unit 22 then simply uses the value θ2s itself as the detection value θs if the value θ2s is −180° or 0°. Such exception handling uses the fact that if the first angle θ1 is −180°, the second angles θ21 and θ22 are also −180°, and if the first angle θ1 is 0°, the second angles θ21 and θ22 are also 0°.

In the second example, there is no such exception, and the detection value generation unit 22 always calculates the detection value θs by Eq. (7).

The processing content of the detection value generation unit 22 is not limited to the foregoing example. For example, the detection value generation unit 22 may retain a table indicating the correspondence between the detection signal S1 and the detection value θs, and generate the detection value θs from the detection signal S1 by referring to the table. The correspondence between the detection signal S1 and the detection value θs in the foregoing table may be theoretically determined as described above, or determined by experiment.

Next, the operation and effect of the position detection device 1 according to the present embodiment will be described. The magnetic sensor 3 of the position detection device 1 includes at least one MR element R. Each MR element R includes the first magnetic layer having the first magnetization that can change in direction within a predetermined plane, namely, the second plane PL21 or PL22. Each MR element R is thus suitable to detect the magnetic field that changes in direction within the predetermined plane, i.e., the second plane PL21 or PL22.

Meanwhile, the magnetic field to be detected generated by the magnet 2 has the first direction D1 at the reference position P0 in the first plane PL1 (YZ plane). As the position of the magnet 2 changes, the first direction D1 changes within a predetermined variable range in the first plane PL1. In other words, as the position of the magnet 2 changes, the first direction D1 changes within a variable range including a direction outside the foregoing predetermined plane. According to the present embodiment, the detection value θs corresponding to the position of the magnet 2 can be generated while suppressing a drop in the detection accuracy even if the magnetic sensor 3 includes the MR elements R suitable to detect a magnetic field that changes in direction within a predetermined plane and the direction of the magnetic field to be detected at the reference position P0 changes within a variable range including a direction outside the predetermined plane in the following manner.

In the present embodiment, each MR element R is located on the slope of the substrate 10, and the second plane PL21 or PL22 corresponding to each MR element R is tilted to form a dihedral angle α with respect to the first plane PL1. Each MR element R can thus detect the in-plane component that is a component of the magnetic field to be detected. The second directions D21 and D22 that are the directions of the in-plane component change with a change in the first direction D1 that is the direction of the magnetic field to be detected at the reference position P0. The first direction D1 changes with a change in the position of the magnet 2. Therefore, the second directions D21 and D22 also change with the change in the position of the magnet 2.

In each MR element R, the direction of the first magnetization changes with a change in the second direction D21 or D22. The detection value θs depends on the direction of the first magnetization. Consequently, the detection value θs depends on the first direction D1 and the second directions D21 and D22, and corresponds to the position of the magnet 2.

Now, if the second plane is a plane perpendicular to the first plane PL1, the strength of the in-plane component may have a value of 0 or near 0 depending on the first direction D1. An example of the case where the second plane is perpendicular to the first plane PL1 is where the second plane is a plane obtained by rotating the XY plane about an axis in the X direction by an angle greater than 0° and smaller than 90°. In this case, the strength of the in-plane component has a value of 0 if the first direction D1 is perpendicular to the second plane, and has a value near 0 if the first direction D1 is almost perpendicular to the second plane. If the strength of the in-plane component has a value of 0 or near 0, the detection accuracy of the magnetic sensor 3 drops greatly with respect to variations in the strength of the magnetic field to be detected.

In the present embodiment, each of the second planes PL21 and PL22 intersects with the first plane PL1 at a dihedral angle α other than 90°. This prevents the strength of the in-plane component from becoming zero regardless of the first direction D1 within the variable range as long as there is a magnetic field to be detected. According to the position detection device 1 of the present embodiment, the detection value θs corresponding to the position of the magnet 2 can be generated while suppressing a drop in the detection accuracy even if the magnetic sensor 3 includes the MR elements R suitable to detect a magnetic field that changes in direction within a predetermined plane and the direction of the magnetic field to be detected at the reference position P0 changes within the variable range including the direction outside the predetermined plane.

In the present embodiment, the position of the magnet 2 can change to move within the linear range of movement RM. The range of movement RM lies in the vertical plane VP perpendicular to the main surface. The magnet 2 is magnetized in a direction parallel to the vertical plane VP. The vertical plane VP and the reference plane RP of each MR element R intersect at a dihedral angle α other than 90°. Such a configuration prevents the strength of the component of the magnetic field to be detected parallel to the reference plane RP, i.e., the in-plane component from becoming zero regardless of the first direction D1 within the variable range as long as the magnetic field to be detected exists. This provides the foregoing effects.

In the present embodiment, the first plane PL1 is perpendicular to the top surface 10Ma and the bottom surface 10Mb that are the main surfaces of the substrate 10. According to the present embodiment, the positional relationship between the magnetic sensor 3 and the magnet 2 can therefore be easily defined.

A favorable range of the dihedral angle α will now be described. Assuming that the magnetic field to be detected has a strength of H1, the minimum value of the strength of the in-plane component is $H1 \cdot \cos \alpha$. The minimum value of the strength of the in-plane component is preferably 10% or more of H1, more preferably 30% or more. The dihedral angle α is thus preferably 84° or less, more preferably 73° or less. Too small the dihedral angle α can make it difficult to form the MR element R on the slope of the substrate 10. The dihedral angle α is therefore preferably 30° or greater, more preferably 45° or greater. In summary, the dihedral angle α is preferably in the range of 30° to 84°, more preferably in the range of 45° to 73°.

The direction of the first magnetization in the first magnetic layer of the MR element R preferably follows a change in the second direction D21 or D22 of the in-plane component with high accuracy. For that purpose, the first magnetic layer preferably has a characteristic that the first magnetization is saturated by the magnetic field to be detected if the first direction D1 of the magnetic field to be detected is in at least a part of the variable range. The first magnetic layer more preferably has a characteristic that the first magnetization is saturated by the magnetic field to be detected regardless of what direction within the variable range the first direction D1 is.

If the MR element R is a spin valve MR element, the first magnetic layer preferably has a small uniaxial magnetic anisotropy in order for the direction of the first magnetization of the first magnetic layer to follow a change in the second direction D21 or D22 with high accuracy.

The first magnetic layer of the MR element R may have a characteristic that the first magnetization is saturated by the magnetic field to be detected regardless of what direction within the variable range the first direction D1 is. In this case, the direction of the first magnetization of the first magnetic layer does not vary depending on variations in the strength of the magnetic field to be detected. This can reduce variations in the detection value θs due to variations in the strength of the magnetic field to be detected. The strength of the magnetic field to be detected can vary, for example, due to a change in the ambient temperature and variations in the positional relationship between the magnetic sensor 3 and the magnet 2.

The position detection device 1 according to the present embodiment can be used as an device for detecting the position of various types of objects if the position detection device is configured such that the magnet 2 moves with the movement of the objects to detect the position thereof. For example, the position detection device 1 can be applied to a camera module including the following optical image stabilization mechanism. The camera module includes a lens, a support mechanism, and a driving unit. The optical axis direction of the lens is parallel to the Z direction in the present embodiment. The support mechanism supports the lens such that the lens can move in first and second directions perpendicular to the Z direction. The driving unit is a unit for moving the lens in the first and second directions.

In such a camera module, the position of the lens in the first direction and the position of the lens in the second direction need to be detected. The position detection device 1 according to the present embodiment can be used to detect the position of the lens. If the position detection device 1 is used to detect the position of the lens in the first direction, the position detection device 1 can be configured such that the magnet 2 moves in a direction parallel to the Y direction in the present embodiment along with the movement of the lens in the first direction. Similarly, if the position detection device 1 is used to detect the position of the lens in the second direction, the position detection device 1 can be configured such that the magnet 2 moves in a direction parallel to the Y direction in the present embodiment along with the movement of the lens in the second direction.

Next, a result of a simulation for demonstrating that the detection value θs corresponding to the position of the magnet 2 can be generated by the position detection device 1 will be described. In the simulation, the direction of magnetization of the magnet 2 is set to the Y direction. The range of movement RM is represented by a segment parallel to the Y direction. In the simulation, the position of the magnet 2 is expressed by a value whose absolute value is the distance between the position reference point 2C and the center of the range of movement RM. The position of the magnet 2 is expressed in negative values if the position reference point 2C is on the −Y direction side with respect to the center of the range of movement RM. The position of the magnet 2 is expressed in positive values if the position reference point 2C is on the Y direction side with respect to the center of the range of movement RM.

In the simulation, a magnetic flux density By corresponding to the second component Hy of the magnetic field to be detected H in the direction parallel to the Y direction and a magnetic flux density Bz corresponding to the first component Hz of the magnetic field to be detected H in the direction parallel to the Z direction were determined. In the simulation, a magnetic flux density Bu corresponding to a component Hu of the in-plane component on the second plane PL21 is further determined. The component Hu is a component in a direction parallel to the U direction. The magnetic flux density Bz is expressed in negative values if the direction of the first component Hz is the −Z direction, and expressed in positive values if the direction of the first component Hz is the Z direction. The magnetic flux density By is expressed in negative values if the direction of the second component Hy is the −Y direction, and expressed in positive values if the direction of the second component Hy is the Y direction. The magnetic flux density Bu is expressed in negative values if the direction of the component Hu is the −U direction, and expressed in positive values if the direction of the component Hu is the U direction.

Figure 13:
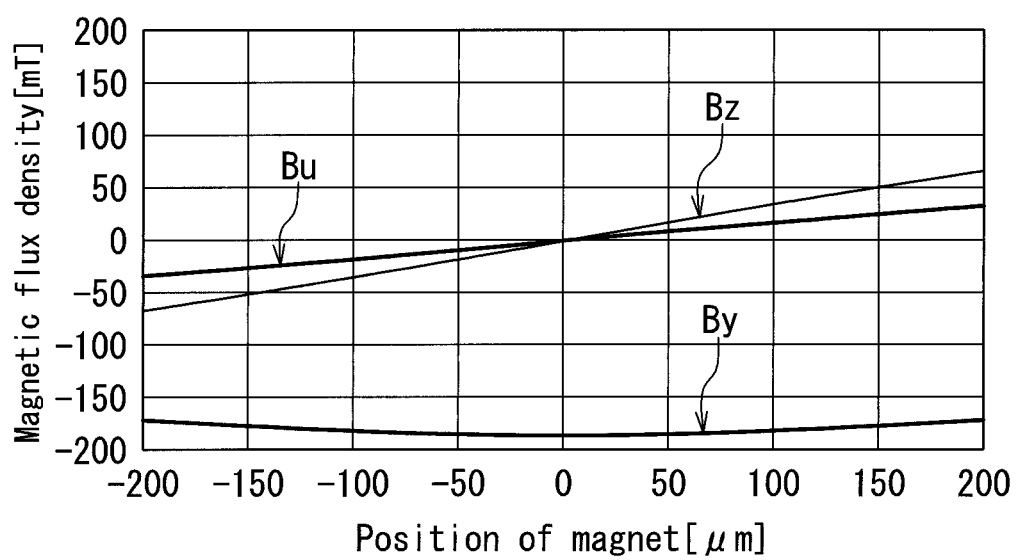
FIG. 13 is a characteristic diagram illustrating a simulation results.

FIG. 13 shows a relationship between the position of the magnet 2 and the magnetic flux densities By, Bz, and Bu determined by the simulation. In FIG. 13, the horizontal axis indicates the position of the magnet 2, and the vertical axis the magnetic flux densities By, Bz, and Bu.

Figure 14:
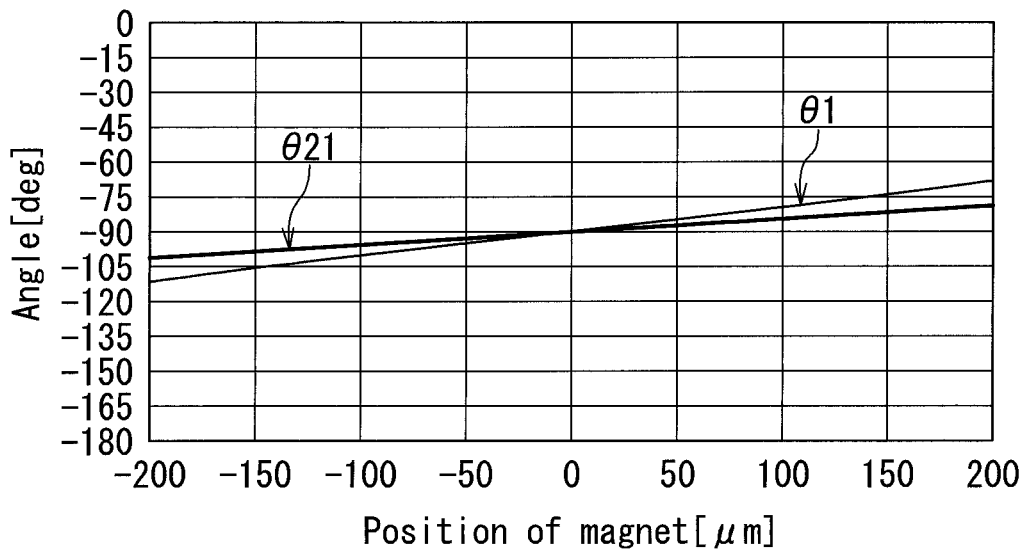
FIG. 14 is a characteristic diagram illustrating the simulation results.

In the simulation, the first angle θ1 shown in FIG. 10 and the second angle θ21 shown in FIG. 11 were determined by using the result shown in FIG. 13. FIG. 14 shows a relationship between the position of the magnet 2 and the angles θ1 and θ21 determined by the simulation. In FIG. 14, the horizontal axis indicates the position of the magnet 2, and the vertical axis the angles θ1 and θ21.

As can be seen from FIG. 14, both the first and second angles θ1 and θ21 have a correlation with the position of the magnet 2, and the second angle θ21 has a correlation with the first angle θ1. As described above, the detection value θs in the present embodiment may be a value indicating the first angle θ1 or a value indicating the second angle θ21. From the result of the simulation, it can be seen that the detection value θs corresponding to the position of the magnet 2 can be generated according to the present embodiment.

Second Embodiment

Figure 15:
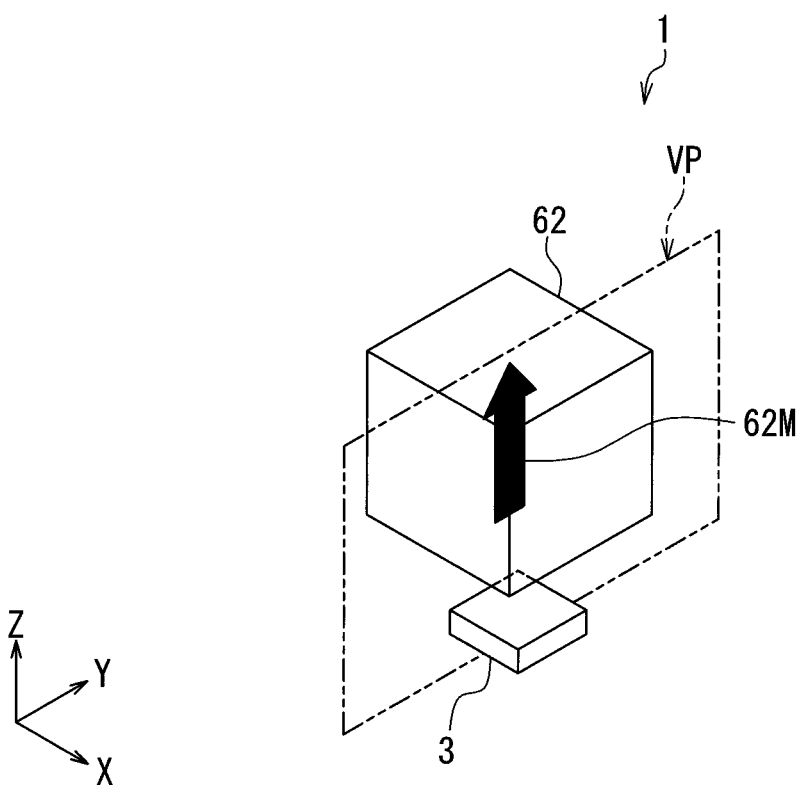
FIG. 15 is a perspective view showing a position detection device according to a second embodiment of the invention.
Figure 16:
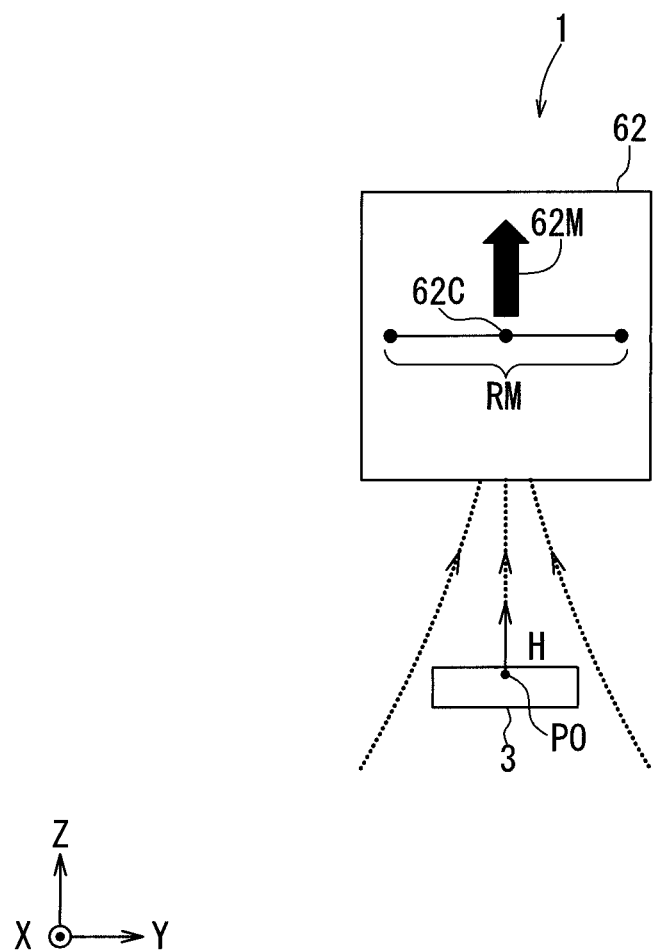
FIG. 16 is a sectional view showing the position detection device according to the second embodiment of the invention.

A second embodiment of the invention will now be described. FIG. 15 is a perspective view of a position detection device 1 according to the present embodiment. FIG. 16 is a sectional view of the position detection device 1 according to the present embodiment. Differences of the position detection device 1 according to the present embodiment from the position detection device 1 according to the first embodiment will be described below. The position detection device 1 according to the present embodiment includes a magnetic field generator 62 instead of the magnetic field generator 2 of the first embodiment. In particular, in the present embodiment, the magnetic field generator 62 is a magnet. The magnet will hereinafter be also denoted by the reference numeral 62. A description of the magnet 62 applies to the magnetic field generator 62 as well.

The magnet 62 lies above the magnetic sensor 3. Like the first embodiment, the magnet 62 is magnetized in a direction parallel to the vertical plane VP. In particular, in the present embodiment, the magnet 62 is magnetized in the Z direction. In FIGS. 15 and 16, the arrow denoted by the reference numeral 62M indicates the direction of magnetization of the magnet 62. In FIG. 16, a plurality of dotted lines represent a part of a magnetic flux corresponding to the magnetic field to be detected.

Like the first embodiment, the relative position of the magnet 62 with respect to the magnetic sensor 3 will be referred to simply as the position of the magnet 62. The relative position of the magnet 62 can change so that a position reference point 62C in the magnet 62 moves within a linear range of movement RM. An example of the position reference point 62C is the center of gravity of the magnet 62.

The range of movement RM of the present embodiment is the same as that of the first embodiment. More specifically, the range of movement RM lies in a vertical plane VP shown in FIG. 15. FIG. 16 shows a cross section taken along the vertical plane VP. In particular, in the present embodiment, the vertical plane VP refers to a YZ plane. The range of movement RM is represented by a line segment parallel to the Y direction.

In the present embodiment, a first plane PL1, a reference position P0, a first direction D1, a first angle θ1, second planes PL21 and PL22, second directions D21 and D22, and second angles θ21 and θ22 are defined as in the first embodiment. FIG. 16 shows the first plane PL1 that coincides with the vertical plane VP.

As the position of the magnet 62 changes within the range of movement RM, the first direction D1 that is the direction of the magnetic field to be detected H at the reference position P0 changes within a predetermined variable range in the first plane PL1. This can easily be seen from FIG. 16. More specifically, as the position of the magnet 62 changes within the range of movement RM, the direction of the magnetic flux passing through the reference position P0, i.e., the first direction D1 changes.

In the present embodiment, the first angle θ1, and the second angles θ21 and θ22 have a correlation with the position of the magnet 62 as in the first embodiment.

In the present embodiment, the variable range of the first direction D1 is 180° or less in size. The variable range of the first angle θ1 is from −90° to 90° at maximum. The variable range of the second directions D21 and D22 is 180° or less in size. The variable range of the second angles θ21 and θ22 is from −90° to 90° at maximum.

In the present embodiment, the directions of the second magnetization in the MR elements R1 and R4 are the Y direction. The directions of the second magnetization in the MR elements R2 and R3 are the −Y direction. The detection signal S1 can be normalized so that the detection signal S1 has a value of −1 if the second angle θ21 is −90°, a value of 0 if the second angle θ21 is 0°, and a value of 1 if the second angle θ21 is 90°. In this case, instead of Eq. (5) in the first embodiment, the detection signal S1 can be represented by the following Eq. (8):

$$S1 = \sin θ21 \quad (8)$$

Instead of Eq. (6) in the first embodiment, the detection value generation unit 22 of the present embodiment calculates the value θ2s by the following Eq. (9):

$$θ2s = \text{asin } S1 \quad (9)$$

Here, the symbol "asin" represents the arcsine.

The configuration, operation and effects of the present embodiment are otherwise the same as those of the first embodiment.

Third Embodiment

Figure 17:
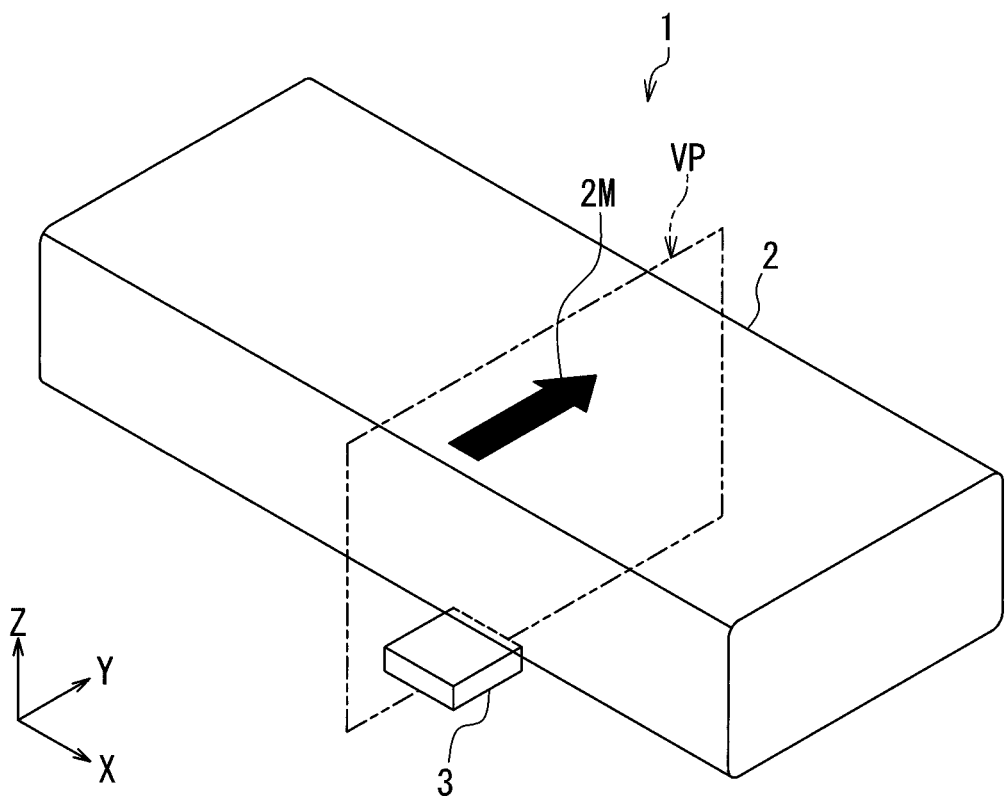
FIG. 17 is a perspective view showing a position detection device according to a third embodiment of the invention.
Figure 18:
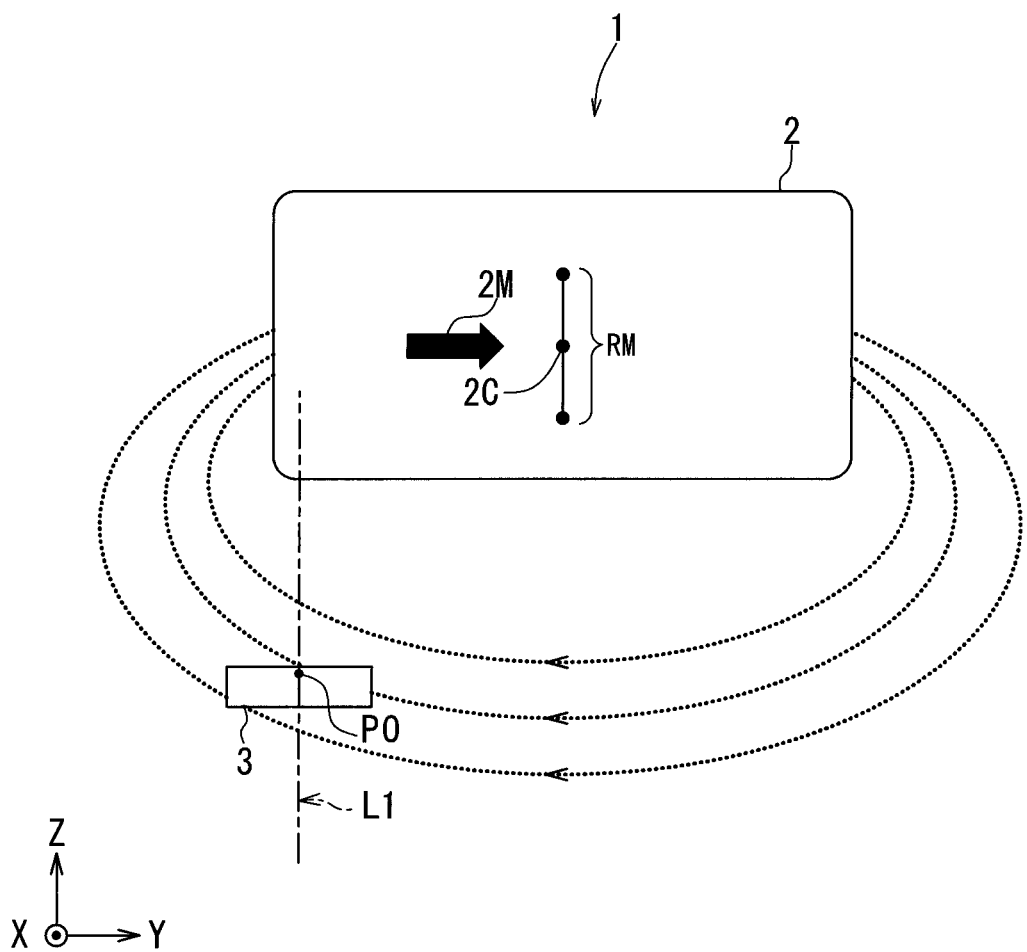
FIG. 18 is a sectional view showing the position detection device according to the third embodiment of the invention.

A third embodiment of the invention will now be described. FIG. 17 is a perspective view of a position detection device 1 according to the present embodiment. FIG. 18 is a sectional view of the position detection device 1 according to the present embodiment. Differences of the position detection device 1 according to the present embodiment from the position detection device 1 according to the first embodiment will be described below.

The position detection device 1 according to the present embodiment differs from the position detection device 1 according to the first embodiment in the range of movement RM of the magnet 2. The range of movement RM in the present embodiment is represented by a segment parallel to the Z direction. The range of movement RM lies in the vertical plane VP illustrated in FIG. 17. The vertical plane VP is a YZ plane. FIG. 18 shows a cross section taken along the vertical plane VP.

As shown in FIG. 18, in the present embodiment, the position reference point 2C that is the center of gravity of the magnet 2 is located at a position off the virtual line L1 in the Y direction. The virtual line L1 passes through the reference position P0 and is parallel to the Z direction.

Like the first embodiment, the direction of magnetization 2M of the magnet 2 of the present embodiment is the Y direction. In FIG. 18, a plurality of dotted lines represent a part of a magnetic flux corresponding to the magnetic field to be detected generated by the magnet 2.

In the present embodiment, a first plane PL1, a reference position P0, a first direction D1, a first angle θ1, second planes PL21 and PL22, second directions D21 and D22, and second angles θ21 and θ22 are defined as in the first embodiment. FIG. 18 shows the first plane PL1 that coincides with the vertical plane VP.

As the position of the magnet 2 changes within the range of movement RM, the first direction D1 that is the direction of the magnetic field to be detected H at the reference position P0 changes within a predetermined variable range in the first plane PL1. This can easily be seen from FIG. 18. More specifically, as the position of the magnet 2 changes within the range of movement RM, the direction of the magnetic flux passing through the reference position P0, i.e., the first direction D1 changes.

In the present embodiment, the first angle θ1, and the second angles θ21 and θ22 have a correlation with the position of the magnet 2 as in the first embodiment.

In the present embodiment, the variable range of the first direction D1 is 90° or less in size. The variable range of the first angle θ1 is from −90° to 0° at maximum. The variable range of the second directions D21 and D22 is 90° or less in size. The variable range of the second angles θ21 and θ22 is from −90° to 0° at maximum.

The position detection device 1 according to the present embodiment can be applied to a camera module including the following autofocus mechanism. The camera module includes a lens, a support mechanism, and a driving unit. The optical axis direction of the lens is parallel to the Z direction in the present embodiment. The support mechanism supports the lens such that the lens can move in a direction parallel to the Z direction. The driving unit is a unit for moving the lens in the direction parallel to the Z direction.

In such a camera module, the position of the lens in the direction parallel to the Z direction need to be detected. The position detection device 1 according to the present embodiment can be used to detect the position of the lens. In this case, the position detection device 1 can be configured such that the magnet 2 moves in a direction parallel to the Z direction along with the movement of the lens.

The configuration, operation and effects of the present embodiment are otherwise the same as those of the first embodiment.

Fourth Embodiment

Figure 19:
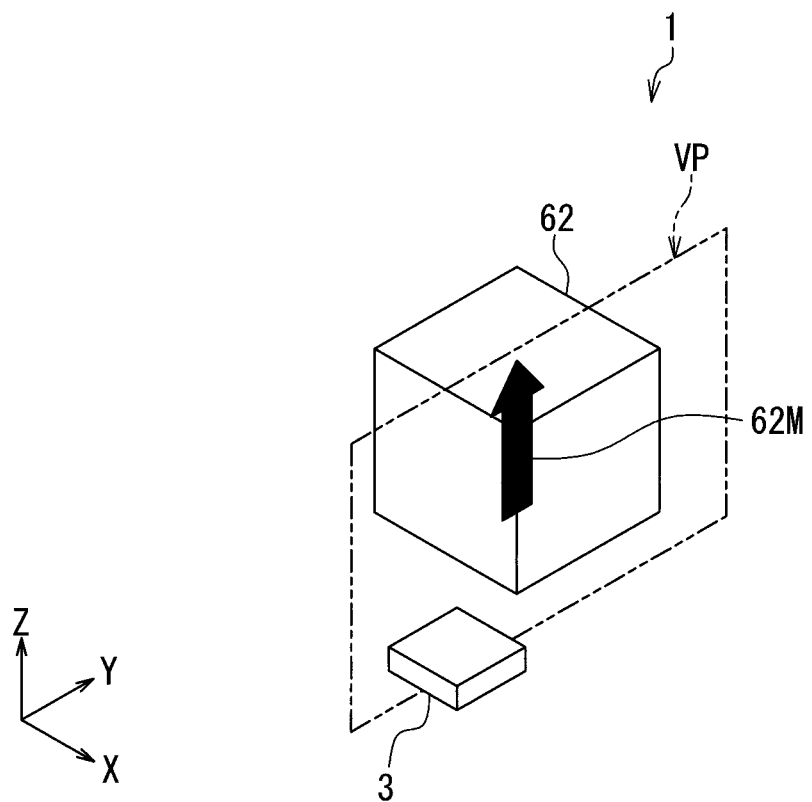
FIG. 19 is a perspective view showing a position detection device according to a fourth embodiment of the invention.
Figure 20:
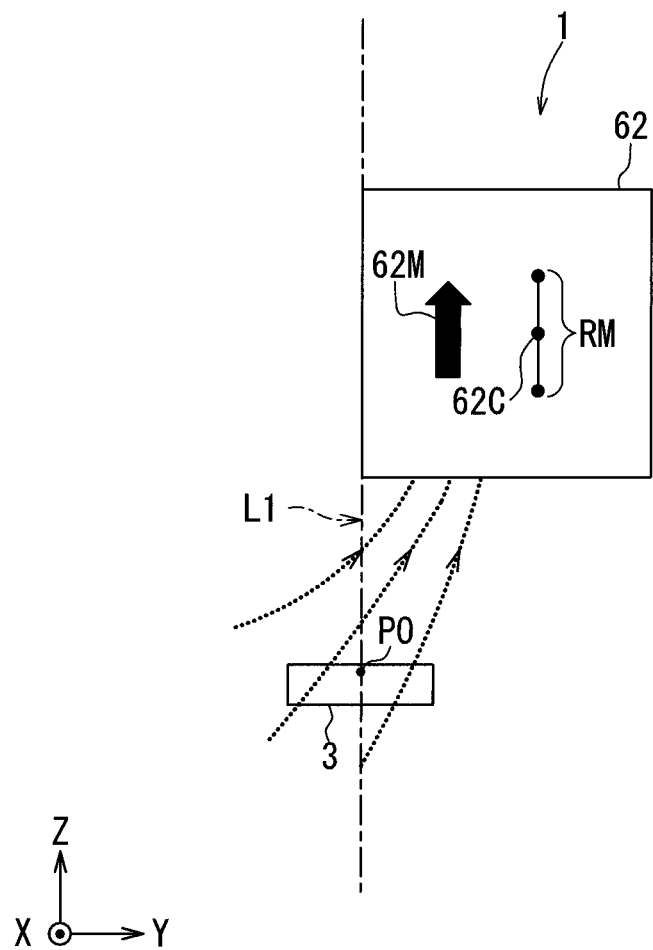
FIG. 20 is a sectional view showing the position detection device according to the fourth embodiment of the invention.

A fourth embodiment of the invention will now be described. FIG. 19 is a perspective view of a position detection device 1 according to the present embodiment. FIG. 20 is a sectional view of the position detection device 1 according to the present embodiment. Differences of the position detection device 1 according to the present embodiment from the position detection device 1 according to the second embodiment will be described below.

The range of movement RM of the magnet 62 in the present embodiment differs from that in the second embodiment. The range of movement RM in the present embodiment is represented by a segment parallel to the Z direction. The range of movement RM lies in the vertical plane VP illustrated in FIG. 19. The vertical plane VP is a YZ plane. FIG. 20 shows a cross section taken along the vertical plane VP.

As shown in FIG. 20, in the present embodiment, the position reference point 62C that is the center of gravity of the magnet 62 is located at a position off the virtual line L1 in the Y direction. The virtual line L1 passes through the reference position P0 and is parallel to the Z direction.

Like the second embodiment, the direction of magnetization 62M of the magnet 62 of the present embodiment is the Z direction. In FIG. 20, a plurality of dotted lines represent a part of a magnetic flux corresponding to the magnetic field to be detected generated by the magnet 62.

In the present embodiment, a first plane PL1, a reference position P0, a first direction D1, a first angle θ1, second planes PL21 and PL22, second directions D21 and D22, and second angles θ21 and θ22 are defined as in the second embodiment. FIG. 20 shows the first plane PL1 that coincides with the vertical plane VP.

As the position of the magnet 62 changes within the range of movement RM, the first direction D1 that is the direction of the magnetic field to be detected H at the reference position P0 changes within a predetermined variable range in the first plane PL1. This can easily be seen from FIG. 20. More specifically, as the position of the magnet 62 changes within the range of movement RM, the direction of the magnetic flux passing through the reference position P0, i.e., the first direction D1 changes.

In the present embodiment, the first angle θ1, and the second angles θ21 and θ22 have a correlation with the position of the magnet 62 as in the second embodiment.

In the present embodiment, the variable range of the first direction D1 is 90° or less in size. The variable range of the first angle θ1 is from 0° to 90° at maximum. The variable range of the second directions D21 and D22 is 90° or less in size. The variable range of the second angles θ21 and θ22 is from 0° to 90° at maximum.

The configuration, operation and effects of the present embodiment are otherwise the same as those of the second embodiment.

Fifth Embodiment

Figure 21:
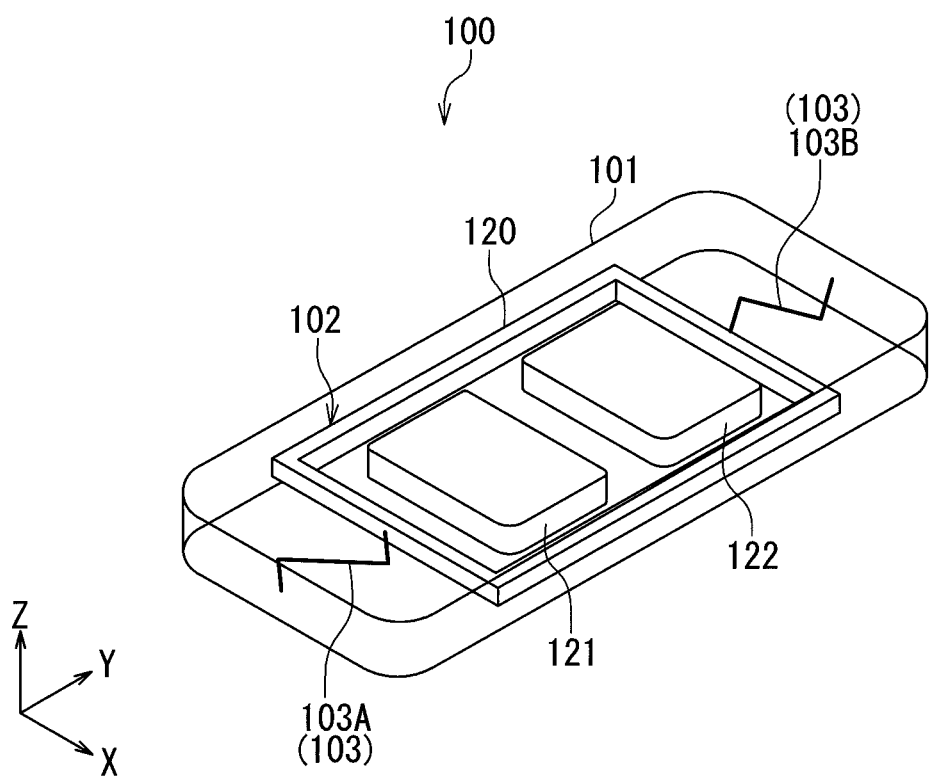
FIG. 21 is a perspective view showing a schematic configuration of the haptic device including the position detection device according to a fifth embodiment of the invention.
Figure 22:
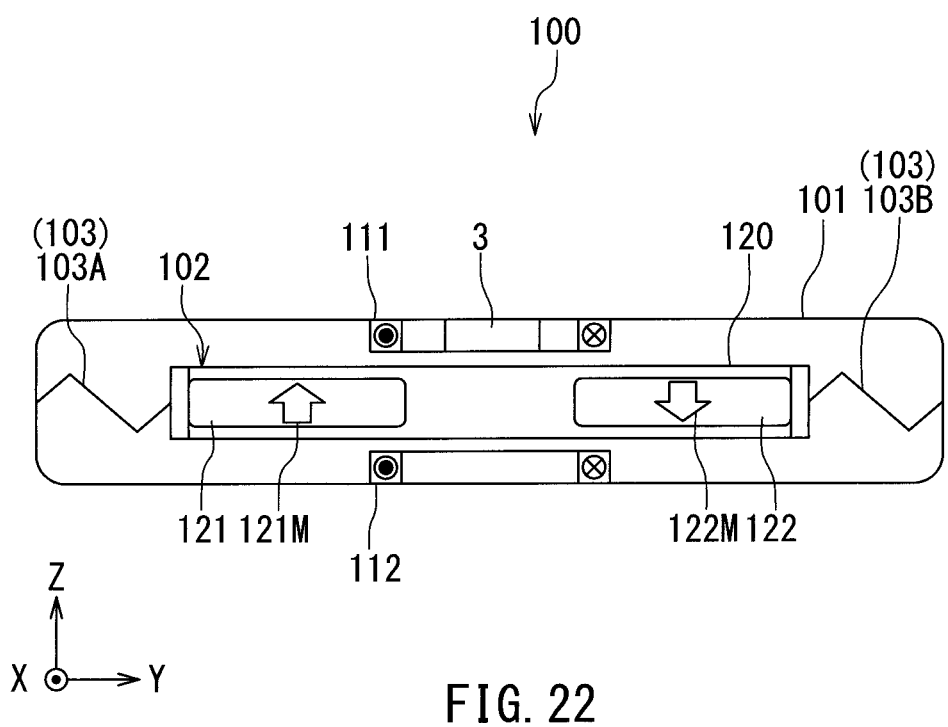
FIG. 22 is a sectional view showing the schematic configuration of the haptic device shown in FIG. 21.

A fifth embodiment of the invention will now be described. A position detection device according to the present embodiment is included in a haptic device 100 shown in FIGS. 21 and 22. The haptic device 100 is a device that can cause mechanical changes, such as vibrations, and give the user virtual force sensation. FIG. 21 is a perspective view showing a schematic configuration of the haptic device 100 including the position detection device according to the present embodiment. FIG. 22 is a sectional view showing the schematic configuration of the haptic device 100 shown in FIG. 21.

As shown in FIGS. 21 and 22, the haptic device 100 includes a housing 101, a moving unit 102, a support unit 103, a first coil 111, a second coil 112, and a magnetic sensor 3. The moving unit 102, the support unit 103, the first coil 111, the second coil 112, and the magnetic sensor 3 are located in the housing 101.

In the present embodiment, mutually orthogonal X, Y, and Z directions are defined as shown in FIGS. 21 and 22.

The housing 101 has a top surface at the end in the Z direction, a bottom surface at the end in the −Z direction, and a connection surface connecting the top and bottom surfaces. Of the dimensions of the housing 101 in the X, Y, and Z directions, the dimension in the Y direction is the largest and the dimension in the Z direction is the smallest.

The moving unit 102 includes a case 120, and a first magnet 121 and a second magnet 122 accommodated in the case 120. The first magnet 121 is arranged on a tip side in the −Y direction with respect to a center position of the case 120 in the Y direction. The second magnet 122 is arranged on a tip side in the Y direction with respect to the center position of the case 120 in the Y direction.

The first magnet 121 is magnetized in the Z direction. In FIG. 22, the arrow denoted by the reference numeral 121M indicates the direction of magnetization of the first magnet 121. The second magnet 122 is magnetized in the −Z direction. In FIG. 22, the arrow denoted by the reference numeral 122M indicates the direction of magnetization of the second magnet 122.

The support unit 103 includes two springs 103A and 103B. The spring 103A connects a part of the inner surface of the housing 101 at the end in the −Y direction and a part of the outer surface of the case 120 at the end in the −Y direction. The spring 103B connects a part of the inner surface of the housing 101 at the end in the Y direction and a part of the outer surface of the case 120 at the end in the Y direction. The support unit 103 supports the moving unit 102 such that the moving unit 102 can move in a direction parallel to the Y direction.

The first coil 111 is bonded to a part of the inner surface of the housing 101 at the end in the Z direction. The second coil 112 is bonded to a part of the inner surface of the housing 101 at the end in the −Z direction. Both the first and second coils 111 and 112 are wound about a virtual center line extending in the Z direction. The first and second coils 111 and 112 each form a space inside.

The magnetic sensor 3 is located in the space inside the first coil 111. The magnetic sensor 3 of the present embodiment has the same configuration as that of the magnetic sensor 3 of the first embodiment.

The first and second magnets 121 and 122 and the magnetic sensor 3 constitute the position detection device according to the present embodiment. The first and second magnets 121 and 122 constitute the magnetic field generator of the present embodiment.

Next, an operation of the haptic device 100 will be described. The first and second coils 111 and 112 are supplied with alternating currents from a not-shown control unit. The direction of the current flowing through the first coil 111 and that of the current flowing through the second coil 112 at the same time are the same. The first and second coils 111 and 112 supplied with the alternating currents generate a magnetic field. By the action of the magnetic field generated by the first and second coils 111 and 112 and a magnetic field generated by the first and second magnets 121 and 122, the moving unit 102 including the first and second magnets 121 and 122 makes mechanical changes in a direction parallel to the Y direction. The mechanical changes of the moving unit 102 give the user virtual force sensation. The mechanical changes of the moving unit 102 include vibrations of the moving unit 102.

The position detection device according to the present embodiment generates a detection value corresponding to each of the relative positions of the first and second magnets 121 and 122 with respect to the magnetic sensor 3. The relative position of the first and second magnets 121 and 122 with respect to the magnetic sensor 3 corresponds to the relative position of the moving unit 102 with respect to the magnetic sensor 3. From the detection value, for example, the relative position of the moving unit 102 with respect to the magnetic sensor 3 and the magnitude of the amplitude of vibrations of the moving unit 102 can thus be found out. The detection value is used, for example, for the control unit to control the operation of the moving unit 102.

The magnetic field to be detected in the present embodiment refers to the magnetic field generated by the first and second magnets 121 and 122. The magnetic field to be detected is applied to the magnetic sensor 3. The magnetic sensor 3 also undergoes the magnetic field generated by the first and second coils 111 and 112 in addition to the magnetic field to be detected. However, the strength of the magnetic field generated by the first and second coils 111 and 112 is sufficiently lower than that of the magnetic field generated by the first and second magnets 121 and 122. The magnetic field generated by the first and second coils 111 and 112 therefore does not have much effect on the detection value of the magnetic sensor 3, and the magnetic sensor 3 substantially detects the magnetic field to be detected.

A relative position of the magnet 121 with respect to the magnetic sensor 3 can change so that a distance between the magnetic sensor 3 and the magnet 121 changes. A relative position of the magnet 122 with respect to the magnetic sensor 3 can change so that a distance between the magnetic sensor 3 and the magnet 122 changes.

The relative positions of the first and second magnets 121 and 122 with respect to the magnetic sensor 3 will hereinafter be referred to simply as the positions of the magnets 121 and 122. The predetermined point in each of the magnets 121 and 122 will be referred to as a position reference point and each of the positions of the magnets 121 and 122 is represented by the position of the position reference point. The position reference point may be the center of gravity of the magnet 121 or the center of gravity of the magnet 122.

The positions of the magnets 121 and 122 can change so that the position reference point moves within a linear range of movement. The range of movement is represented by a line segment parallel to the Y direction.

In the present embodiment, a vertical plane VP, a first plane PL1, a reference position P0, a first direction D1, a first angle θ1, second planes PL21 and PL22, second directions D21 and D22, and second angles θ21 and θ22 are defined as in the first embodiment. FIG. 22 shows the vertical plane VP and the first plane PL1. The vertical plane VP and the first plane PL1 are YZ planes.

The directions of magnetization 121M and 122M of the magnets 121 and 122 are parallel to the vertical plane VP. The range of movement lies in the vertical plane VP.

As the positions of the magnets 121 and 122 change within the range of movement, the first direction D1 that is the direction of the magnetic field to be detected H at the reference position P0 changes within a predetermined variable range in the first plane PL1. FIG. 22 shows a state where the magnets 121 and 122 lie at the center of the range of movement. In such a state, the first direction D1 is the Y direction. If the magnets 121 and 122 move in the −Y direction from the state shown in FIG. 22, the first direction D1 rotates from the Y direction toward the −Z direction. If the magnets 121 and 122 move in the Y direction from the state shown in FIG. 22, the first direction D1 rotates from the Y direction toward the Z direction.

In the present embodiment, the first angle θ1, and the second angles θ21 and θ22 have a correlation with the positions of the magnets 121 and 122 as in the first embodiment.

In the present embodiment, the variable range of the first direction D1 is 180° or less in size. The variable range of the first angle θ1 is from 0° to 180° at maximum. The variable range of the second directions D21 and D22 is 180° or less in size. The variable range of the second angles θ21 and θ22 is from 0° to 180° at maximum.

A specific method for calculating the detection value θs in the present embodiment is the same as that of the first embodiment. The angles θ1, θ21, and θ22 of −180° in the first embodiment are equivalent to the angles θ1, θ21, and θ22 of 180° according to the present embodiment.

The configuration, operation and effects of the position detection device according to the present embodiment are otherwise the same as those of the first embodiment.

The present invention is not limited to the foregoing embodiments, and various modifications may be made thereto. For example, in the present invention, the relative position of the magnetic field generator with respect to the magnetic sensor may change while the distance between the magnetic sensor and the magnetic field generator remains constant.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A position detection device comprising:
a magnetic field generator configured to generate a magnetic field to be detected having a first direction at a reference position within a first plane; and
a magnetic sensor configured to detect the magnetic field to be detected and generate a detection value corresponding to a relative position of the magnetic field generator with respect to the magnetic sensor, the magnetic sensor including:
at least one magnetoresistive element each including a first magnetic layer having first magnetization that can change in direction within a second plane corresponding to the at least one magnetoresistive element, the first plane and the second plane intersecting at a dihedral angle other than 90°, the magnetic field to be detected received by each of the at least one magnetoresistive element being capable of being divided into an in-plane component parallel to the second plane and a perpendicular component perpendicular to the second plane, the in-plane component having a second direction that changes with a change in the first direction, the direction of the first magnetization changing with a change in the second direction, and the detection value depending on the direction of the first magnetization,
wherein the magnetic field generator and the magnetic sensor are configured such that as the relative position of the magnetic field generator with respect to the magnetic sensor changes, the first direction changes within a predetermined variable range in the first plane.

2. The position detection device according to claim 1, wherein the first magnetic layer has a characteristic that the first magnetization is saturated by the magnetic field to be detected if the first direction is in at least a part of the predetermined variable range.

3. The position detection device according to claim 1, wherein the at least one magnetoresistive element each further includes a second magnetic layer having second magnetization in a direction parallel to the second plane, and a gap layer located between the first magnetic layer and the second magnetic layer.

4. The position detection device according to claim 1, wherein the dihedral angle is in a range of 30° to 84°.

5. The position detection device according to claim 1, wherein:
the magnetic sensor further includes a substrate that supports the at least one magnetoresistive element;
the substrate includes a main surface perpendicular to the first plane and at least one slope oblique to the main surface;
the at least one magnetoresistive element is located on the at least one slope; and
the second plane corresponding to each of the at least one magnetoresistive element is parallel to the slope on which each of the at least one magnetoresistive element is located.

6. The position detection device according to claim 5, wherein:
the magnetic sensor includes a first magnetoresistive element and a second magnetoresistive element as the at least one magnetoresistive element;
the substrate includes, as the at least one slope, a first slope on which the first magnetoresistive element is located and a second slope on which the second magnetoresistive element is located;
the second plane corresponding to the first magnetoresistive element is parallel to the first slope; and
the second plane corresponding to the second magnetoresistive element is parallel to the second slope.

7. The position detection device according to claim 6, wherein:
the magnetic sensor further includes a signal output node;
the first and second magnetoresistive elements are connected in series via the signal output node; and
the detection value depends on a potential of the signal output node.

8. The position detection device according to claim 1, wherein the relative position of the magnetic field generator with respect to the magnetic sensor can change so that a distance between the magnetic sensor and the magnetic field generator changes.

9. The position detection device according to claim 1, wherein:
the magnetic field generator is a magnet;
the relative position of the magnetic field generator with respect to the magnetic sensor can change so that a predetermined point in the magnet moves within a linear range of movement; and
the range of movement lies in a plane parallel to the first plane.

10. The position detection device according to claim 9, wherein the magnet is magnetized in a direction parallel to the first plane.

11. A position detection device comprising:
a magnet configured to generate a magnetic field to be detected; and
a magnetic sensor configured to detect the magnetic field to be detected and generate a detection value corresponding to a relative position of the magnet with respect to the magnetic sensor, the magnetic sensor including:
a magnetoresistive element including a first magnetic layer having first magnetization that can change in direction with a direction of the magnetic field to be detected received by the magnetoresistive element within a reference plane; and
a substrate that supports the magnetoresistive element, the substrate including a main surface including a flat surface, and a slope oblique to the main surface, the magnetoresistive element being located on the slope, the reference plane being parallel to the slope,
wherein the relative position of the magnet with respect to the magnetic sensor can change so that a predetermined point in the magnet moves within a linear range of movement,
the range of movement lies in a vertical plane perpendicular to the main surface,
the magnet is magnetized in a direction parallel to the vertical plane, and
the vertical plane and the reference plane intersect at a dihedral angle other than 90°.

* * * * *